(12) United States Patent
Bowen

(10) Patent No.: US 10,260,411 B2
(45) Date of Patent: Apr. 16, 2019

(54) PISTON ARRANGEMENT AND INTERNAL COMBUSTION ENGINE

(71) Applicant: NEWLENOIR LIMITED, London (GB)

(72) Inventor: Ryan Bowen, London (GB)

(73) Assignee: NEWLENOIR LIMITED, London (GB)

( * ) Notice: Subject to any disclaimer, the term of this patent is extended or adjusted under 35 U.S.C. 154(b) by 249 days.

(21) Appl. No.: 14/915,164

(22) PCT Filed: Aug. 27, 2014

(86) PCT No.: PCT/GB2014/052592
§ 371 (c)(1),
(2) Date: Feb. 26, 2016

(87) PCT Pub. No.: WO2015/028789
PCT Pub. Date: Mar. 5, 2015

(65) Prior Publication Data
US 2016/0201554 A1 Jul. 14, 2016

(30) Foreign Application Priority Data
Aug. 30, 2013 (GB) .................................. 1315530.4

(51) Int. Cl.
*F02B 25/00* (2006.01)
*F02B 75/04* (2006.01)
(Continued)

(52) U.S. Cl.
CPC .............. *F02B 75/047* (2013.01); *F01B 9/06* (2013.01); *F02B 25/20* (2013.01); *F02B 33/22* (2013.01);
(Continued)

(58) Field of Classification Search
CPC ........ F02B 75/047; F02B 25/20; F02B 33/22; F02B 47/02; F02B 75/28; F01B 9/06; Y02T 10/121
(Continued)

(56) References Cited

U.S. PATENT DOCUMENTS 2,217,796 A 10/1940 Dell
3,945,364 A 3/1976 Cook
(Continued)

FOREIGN PATENT DOCUMENTS

CA 2770273 A1 8/2013
CN 103122793 A 5/2013
(Continued)

OTHER PUBLICATIONS

Mar. 13, 2014, Combined Search and Examination Report under Sections 17 and 18(3) from the United Kingdom Intellectual Property Office in United Kingdom Patent Application No. GB1315530.4, which is the foreign application to which this U.S. application claims priority.
(Continued)

*Primary Examiner* — Marguerite McMahon
(74) *Attorney, Agent, or Firm* — Kolitch Romano LLP

(57) ABSTRACT

A piston arrangement comprising a cylinder, a piston head movable along a piston axis within the cylinder, a con rod, and a track having a path; wherein the con rod has a first end which is coupled to the piston head and a second end which is coupled to the track; wherein the track is adapted to be moved relative to the cylinder and is shaped such that, as the track moves relative to the cylinder, the piston head moves in reciprocating motion along the piston axis in accordance with the path of the track; wherein the path of the track is shaped such that piston head displacement is non simple harmonic with respect to displacement of the track relative
(Continued)

to the cylinder. Also an internal combustion engine including the piston arrangement.

19 Claims, 14 Drawing Sheets

(51) Int. Cl.
    *F02B 25/20* (2006.01)
    *F02B 33/22* (2006.01)
    *F02B 47/02* (2006.01)
    *F01B 9/06* (2006.01)
    *F02B 75/28* (2006.01)

(52) U.S. Cl.
    CPC .............. *F02B 47/02* (2013.01); *F02B 75/28* (2013.01); *Y02T 10/121* (2013.01)

(58) Field of Classification Search
    USPC ..... 123/25 D, 25 P, 70 R–70 V, 197.2, 190.4
    See application file for complete search history.

(56) References Cited

U.S. PATENT DOCUMENTS

| | | | |
|---|---|---|---|
| 4,635,590 A | 1/1987 | Gerace | |
| 4,706,462 A * | 11/1987 | Soltermack | F02B 1/00 123/25 P |
| 5,040,498 A | 8/1991 | Scherer | |
| 5,228,415 A | 7/1993 | Williams | |
| 6,289,791 B1 | 9/2001 | Henriksen | |
| 8,191,517 B2 | 6/2012 | Mustafa | |
| 8,720,396 B2 * | 5/2014 | Gentili | F02B 33/22 123/70 R |
| 8,851,025 B2 * | 10/2014 | Voisin | F02B 33/22 123/25 A |
| 2003/0097998 A1 | 5/2003 | Gray, Jr. | |
| 2005/0160729 A1 | 7/2005 | Komatsu | |
| 2006/0086335 A1 * | 4/2006 | Boulton | F01L 1/34 123/190.4 |
| 2006/0137631 A1 * | 6/2006 | Patton | F01L 1/022 123/70 R |
| 2007/0039323 A1 * | 2/2007 | Tour | F01B 7/14 60/620 |
| 2008/0202454 A1 | 8/2008 | Pirault | |
| 2008/0223342 A1 | 9/2008 | Angstrom | |
| 2009/0188466 A1 | 7/2009 | Wiens | |
| 2012/0234297 A1 | 9/2012 | McAlister et al. | |

FOREIGN PATENT DOCUMENTS

| | | |
|---|---|---|
| DE | 2535898 A1 | 3/1977 |
| DE | 20306115 U1 | 2/2004 |
| DE | 102008037121 A1 | 2/2010 |
| FR | 732745 A | 9/1932 |
| FR | 2655378 A1 | 6/1991 |
| FR | 2732069 A1 | 9/1996 |
| GB | 191215176 A | 4/1913 |
| GB | 408756 A | 4/1934 |
| GB | 2343715 A | 5/2000 |
| GB | 2383820 A | 7/2003 |
| JP | H03-115743 A | 5/1991 |
| JP | H04-259613 A | 9/1992 |
| JP | 2004-11546 A | 1/2004 |
| JP | 2005-171953 A | 6/2005 |
| JP | 2006-300011 A | 11/2006 |
| JP | 2008-019854 A1 | 1/2008 |
| JP | 2008-025491 A | 2/2008 |
| JP | 2012-503741 A | 2/2012 |
| WO | 9530080 | 11/1995 |
| WO | 9849437 A1 | 11/1998 |
| WO | 0177494 A1 | 10/2001 |
| WO | 2006/105390 A1 | 10/2006 |
| WO | 2007010186 A1 | 1/2007 |
| WO | 2010143998 A1 | 12/2010 |

OTHER PUBLICATIONS

Aug. 12, 2014, Combined Search and Examination Report from the United Kingdom Intellectual Property Office in United Kingdom Patent Application No. GB1315530.4, which is the foreign application to which this U.S. application claims priority.

Jan. 5, 2015, International Search Report of the International Searching Authority of the European Patent Office in PCT/GB2014/052592, which is the international application to this U.S. application.

Jan. 5, 2015, Written Opinion of the International Searching Authority of the European Patent Office in PCT/GB2014/052592, which is the international application to this U.S. application.

European Patent Office, Communication pursuant to Article 94(3) EPC in European Patent Application No. 14758620.0, dated Aug. 4, 2017, which is a foreign counterpart application to this U.S. application.

Japan Patent Office, Office action in Japanese Patent Application No. 2016-537379, dated Jul. 31, 2018, which s a foreign counterpart application to this U.S. application.

* cited by examiner

PISTON ARRANGEMENT AND INTERNAL COMBUSTION ENGINE

CROSS-REFERENCE TO RELATED APPLICATIONS

This application is a national phase application of PCT/GB2014/052592, filed Aug. 27, 2014, which claims priority to United Kingdom Patent Aplication No. 1315530.4, filed Aug. 30, 2013, each of which is hereby incorporated by reference.

FIELD OF THE INVENTION

The present invention relates to a piston arrangement, piston systems including the piston arrangement, and internal combustion engines including the piston arrangement.

BACKGROUND OF THE INVENTION

A conventional crankshaft and con rod arrangement is commonly used to convert linear motion of a piston to rotary motion of an output shaft, or vice-versa. In these piston arrangements the piston head reciprocates within a cylinder in distorted simple harmonic motion, the distortion being due to the effective lengthening and shortening of the con rod with angular displacement. Since the piston head is only capable of moving in distorted simple harmonic motion, the performance and applications of these piston arrangements is limited. This invention relates to a piston arrangement which overcomes the limitations of a standard crankshaft and con rod type piston arrangement and its application in internal combustion engines and other systems.

SUMMARY OF THE INVENTION

A first aspect of the invention provides a piston arrangement comprising a cylinder, a piston head movable along a piston axis within the cylinder, a con rod, and a track having a path; wherein the con rod has a first end which is coupled to the piston head and a second end which is coupled to the track; wherein the track is adapted to be moved relative to the cylinder and is shaped such that, as the track moves relative to the cylinder, the piston head moves in reciprocating motion along the piston axis in accordance with the path of the track; wherein the path of the track is shaped such that piston head displacement is non simple harmonic with respect to displacement of the track relative to the cylinder.

A con rod is defined as an elongate member coupled to a piston and adapted to drive the piston and/or be driven by the piston as part of a power transfer mechanism for the piston. A track is defined as a component or system which provides a path with a particular shape which is adapted to guide or constrain the movement of one or more other components or systems in accordance with the shape of the path.

Non simple harmonic motion is defined as motion which is not perfectly simple harmonic according to a mathematical sine wave, eg if the piston head displacement was platted against the displacement of the track with respect to the cylinder the relationship would not follow a perfect sine wave. The displacement of the track with respect to the cylinder may be angular displacement or linear displacement depending on the form in which the track is provided, as will become apparent from the following summary and description.

Since the piston head does not move in simple harmonic motion with respect to movement of the track relative to the cylinder, if the track were to be moved relative to the cylinder at a constant speed the piston head would not follow simple harmonic motion. It should be noted that the invention does not require that track actually moves relative to the cylinder at a constant speed in normal use of the piston arrangement.

The displacement profile of the piston head with respect to the track position may be substantially different to simple harmonic motion. For example, as the piston head moves in reciprocating motion, its displacement may deviate from perfect mathematical simple harmonic motion with respect to the track displacement by at least 1% or at least 2% or at least 3% or at least 5% or at least 10% or at least 15% or at least 20% or at least 25% over at least a portion of its movement cycle. Alternatively, the path of the track may be shaped such that the displacement profile of the piston head is more significantly different to simple harmonic motion. For example, the piston head displacement profile may include at least one of a) multiple different top dead centre and/or bottom dead centre positions, b) mid-stroke periods of reduced piston head speed, c) increased dwell time at or near top dead centre and/or bottom dead centre positions, and d) relatively quicker or slower average speed over a first half of a piston stroke, as described below. The piston is not, therefore, limited to simple harmonic motion or distorted simple harmonic motion (as is the case with conventional crank-shaft and con rod type piston arrangements), and so displacement and acceleration can be tuned as required and optimised for the specific application of the piston arrangement.

The piston arrangement may, for example, be used in an internal combustion engine or a pump, or in any other system where reciprocation linear motion of a piston is converted to rotary or reciprocating motion of another component or vice-versa.

The track may have a path shape which is not sinusoidal. The track may generally have any path shape required to generate the desired piston displacement and acceleration profile. The path may be substantially non-sinusoidal. The path may also be curved (in addition to having a path of a particular shape to generate the desired piston head displacement profile), but a curvature in the track, for example if the track is provided as a substantially circular continuous loop, need not affect the shape of the path.

The track may have a first local minimum and a second local minimum different to the first local minimum such that as the piston head moves in reciprocating motion along the piston axis it passes through a first bottom dead centre position corresponding to the first local minimum of the track and subsequently passes through a second bottom dead centre position corresponding to the second local minimum of the track, wherein the piston is at a different displacement with respect to the cylinder when it is in the second bottom dead centre position to when it is in the first bottom dead centre position. Alternatively, or in addition, the track may include two different local maxima corresponding to two different top dead centre positions. The track may generally comprise any number of local maxima corresponding to any number of respective top dead centre positions at the same or any number of different piston displacements. The track may also comprise any number of local minima corresponding to any number of respective bottom dead centre positions at the same or any number of different piston displacements. The piston head may therefore operate on a cycle including different stroke lengths for different phases of the operation cycle, for example a long combustion power stroke followed by a short steam power stroke in the context of an internal combustion engine.

The track may include at least one portion of reduced gradient at a location between a local minimum of the track and an adjacent local maximum of the track such that as the piston head moves between a bottom dead centre position corresponding to the local minimum and a top dead centre position corresponding to the local maximum it experiences at least one period of reduced speed. The period of reduced speed may comprise a prolonged period of reduced piston speed in between periods of comparatively higher piston speed, and may occur at any point during a piston stroke as required, for example near to a bottom dead centre position, near to a top dead centre position or at any location in-between. The period of reduced piston speed may include a period in which the piston head is substantially stationary. The gradient of the track on either side of the portion of reduced gradient is greater than the gradient at the portion of reduced gradient.

The track may include a prolonged portion of low gradient or zero gradient at or near a local maximum or local minimum of the track such that, as the piston head moves through a top dead centre position corresponding to the local maximum or through a bottom dead centre position corresponding to the local minimum, it experiences a substantial period of dwell time. The period of dwell time may be significantly greater than that experienced by a piston operating within a cylinder using a standard crank shaft and con rod mechanism. Increased dwell time may, for example, be used to increase the efficiency of fluid transfer into or out of a cylinder.

In a conventional crankshaft and con rod arrangement operating in simple harmonic motion (ignoring the distorting effect of the con rod angle), when a piston moves away from a top dead centre position towards the following bottom dead centre position (or away from a bottom dead centre position towards the following top dead centre position), it moves through the first 2.5% of its stroke displacement after approximately 18 degrees of crankshaft rotation, which equates to approximately 10% of the crank shaft rotation required between the top dead centre position and the following bottom dead centre position. Similarly, the piston moves through the first 5% of its stroke displacement after approximately 26 degrees of crankshaft rotation, which equates to approximately 14% of the crank shaft rotation between TDC and BDC, and through the first 10% of its stroke displacement after approximately 37 degrees of crankshaft rotation, which equates to approximately 20% of the crank shaft rotation between TDC and BDC.

By comparison, if the track of the invention includes a prolonged portion of low or zero gradient at or near a local maximum (or local minimum), it may retain the piston head within the first 2.5% of its displacement away from the corresponding top dead centre position (or bottom dead centre position) until at least 15% or at least 20% or at least 25% or at least 30% of the relative track movement from the local maximum towards the following local minimum (or from the local minimum towards the following local maximum). Similarly, it may retain the piston head within the first 5% of its stroke displacement until at least 20% or at least 25% or at least 30% or at least 35% of the relative track movement, and it may retain the piston head within the first 10% of its stroke displacement until at least 25% or at least 30% or at least 35% or at least 40% of the relative track movement.

The track may comprise a local maximum, an adjacent local minimum, and a half-way point at a location half-way between the local maximum and the adjacent local minimum in a direction aligned with the relative movement of the track and the cylinder. If the track is in the form of a substantially circular continuous loop, the half-way point may be at an angular mid-point between the local maximum and the adjacent local minimum. The track may have a steeper average gradient over a first portion of its length extending from the local maximum to the half-way point than over a second portion of its length extending from the half-way point to the local minimum. Therefore the piston head may have a top dead centre position corresponding to the local maximum, a bottom dead centre position corresponding to the local minimum, and a first intermediate position corresponding to the half-way point between the local maximum and the adjacent local minimum, wherein the first intermediate position is closer to the bottom dead centre position than the top dead centre position. For example, when the piston head is in the first intermediate position it may be at least 52.5% or at least 55% or at least 57.5% or at least 60% or at least 65% or at least 70% or at least 75% of the way from the top dead centre position to the bottom dead centre position. Alternatively the track may have a steeper average gradient between the half-way point and the local minimum than between the top dead centre position and the half-way point. The piston speed and acceleration may therefore be varied within a stroke as desired. For example, when applied to an internal combustion engine, the piston speed may be greater over the first half of a power stroke than in the second half of the power stroke to more efficiently extract work and reduce piston temperatures.

Alternatively the track may have a steeper or less steep average gradient between the end of a portion of track the track having a low or zero gradient a half-way point to an adjacent local minimum, or a steeper or less steep average gradient between the end of a portion of track the track having a low or zero gradient a half-way point to an adjacent local maximum.

The track may form a closed loop and be provided on a rotating body. Alternatively the track may form an arc and be provided on a reciprocating rotating body, or be provided on a component which does not rotate, for example a linear track may be provided on a linearly reciprocating body.

The track may be provided on a drum or disk which rotates relative to the cylinder. The track may be provided on an inner or outer radial surface of a drum, or on an end surface of a drum, or on an outer radial surface of a disk or on an end surface of a disk. The track may be shaped such that the con rod moves in a direction substantially perpendicular to the surface on which the track is provided, or alternatively in a direction substantially parallel to the surface on which the track is provided. Alternatively the track may be fixed and the cylinder may rotate relative to the drum of disk.

The track may be recessed into and/or protrude from a surface of the drum or disk. The track may be integrally formed as part of the drum or disk or at least a part of the track may be attached to the drum or disk as one or more separate track components.

The con rod may have one or more followers which engage the track to control displacement of the con rod. The followers may, for example, comprise bearings, rollers, bosses or similar. Followers may be located on one side of the con rod only, but preferably at least two followers are located on opposite sides of the con rod.

The con rod may have at least two followers which are spaced apart from each other in a direction parallel to the cylinder axis. The followers may be located on alternate sides of a projecting portion of the track such that the projecting portion of the track extends between the followers. Alternatively the followers may both be located between a base of the track and a projecting portion of the track.

The con rod may have at least two followers mounted to the con rod via a bogie which is pivotally mounted to the con rod. The followers may be bosses which are integrally formed with the bogie or alternatively wheels or rollers attached to the bogie via integral spindles or separate shafts. The con rod may be mounted to the bogie via a spindle or shaft used to mount one or more of the followers to the bogie, or alternatively at another location.

The track may include a first surface which engages one or more of the followers to move the piston head in a first direction along the piston axis and a second surface opposing the first surface which engages one or more of the followers to move the piston head in a second direction opposite to the first direction along the cylinder axis.

The first surface may be a base of the track and the second surface may be an opposing wall. The track may therefore be driven in a first direction by movement of the piston head in either direction along the piston axis and the piston may be moved in either direction along the piston axis by the track as the track moves in the first direction. One or more followers may be arranged to engage the first surface but not the second surface and one or more followers may be arranged to engage the second surface but not the first surface. The followers arranged to engage the first and second surfaces may be different in size, shape or specification depending on the loading requirements in each direction.

The con rod may be constrained to move substantially in the direction of the cylinder axis without rotating relative to the piston head. The con rod may be constrained such that it cannot rotate by an angle of more than 0.5 degrees, or more than 1 degree, or more than 2 degrees, or more than 3 degrees, or more than 5 degrees relative to the piston head. The con rod movement may, for example, be constrained by a sleeve within which the con rod slides. Alternatively the con rod may be constrained by rollers, bearings or retaining surfaces, or may be mounted to one or more swinging arms. The con rod may be pivotally mounted to the piston head to allow a small degree of rotational movement. Alternatively the con rod may be integrally formed with or otherwise rigidly attached to the piston head.

The con rod may have a fixed, inextensible length. Alternatively the con rod may have a variable length. A variable length con rod may be adjusted to shift the displacement profile of the piston head. If the length of the con rod is increased (or decreased) then the height of the top dead centre and bottom dead centre positions will be correspondingly increased (or decreased). The displacement profile may therefore be optimised for different operating conditions by adjustment of the con rod length. The con rod may be adapted to be adjusted only when the piston arrangement is not in use. Alternatively the con rod may be adapted to be adjusted in use while the piston head is moving.

The con rod may comprise at least two sections having a threaded connection to each other, at least one of the sections being rotatable relative to the other section in order to increase or decrease the overall length of the con rod. For example, a variable length con rod may comprise a track following section coupled to the track via one or more followers and/or a bogie arrangement and a piston mounting section coupled to the piston head, for example via a gudgeon pin. The piston mounting section may have a threaded connection with the track following section and may be adapted to be rotated while the track following section remains rotationally fixed to vary the length of the con rod. Alternatively, a variable length con rod may further comprise an intermediate section connecting the piston mounting section to the track following section, the intermediate section having threaded connections with both the piston mounting section and the track following section, the intermediate section being adapted to be rotated while the piston mounting section and the track following section remain rotationally fixed.

Each piston mounting section, intermediate section and track following section may be provided with a projection and/or recess received by one or more location control features which may be used to cause or prevent rotational movement. A piston head having an extended skirt may comprise one or more projections or recesses received by one or more location control features instead of or in addition to projections and/or recesses on the piston mounting section. Position control features may be actuated to rotate a section of the con rod, thereby changing the con rod length, by rotating the piston control feature about a longitudinal axis of the con rod. One or more position control features may be provided by the means used for constraining the con rod to movement substantially in the direction of the cylinder axis.

A piston system may include at least two piston arrangements according to the first aspect of the invention. The respective con rods of the multiple piston arrangements may be coupled to a common track. Any number of piston arrangements may be connected to and spaced apart along a common track as required. Alternatively a piston system may include two piston arrangements according to the first aspect of the invention operating opposed pistons within a common cylinder, with the respective tracks being fixed or moveable relative to each other. Alternatively a piston system may comprise a first piston arrangement according to the first aspect of the invention, the cylinder of the first piston arrangement having a fixed head wall opposing the piston head, and a second piston arrangement according to the first aspect of the invention, the cylinder of the second piston arrangement having an opening into the fixed head wall of the first piston arrangement.

A piston system may include first and second piston arrangements according to the first aspect of the invention with con rods of the first and second piston arrangements respectively coupled to separate first and second tracks which are moveable with respect to each other to vary the relative timing of the respective piston heads of the first and second piston arrangements.

An internal combustion engine may comprise a piston arrangement according to the first aspect of the invention.

A second aspect of the invention provides a piston arrangement comprising a cylinder, a piston head movable along a piston axis within the cylinder, a con rod, and a track; wherein the con rod has a first end which is coupled to the piston head and a second end which is coupled to the track; wherein the track is adapted to be moved relative to the cylinder and is shaped such that, as the track moves relative to the piston, the piston moves in reciprocating motion along the axis in accordance with the shape of the track; wherein the con rod has at least two followers which engage the track to control displacement of the con rod, the at least two followers being mounted to the con rod via a bogie which is pivotally mounted to the con rod.

A third aspect of the invention provides an internal combustion engine comprising first and second piston arrangements according to the first aspect of the invention, wherein the first and second piston arrangements respectively comprise first and second piston heads movable within a common cylinder, wherein the first and second piston heads oppose each other such that a chamber is formed between the first and second piston heads.

The track of the first piston arrangement may be provided on a first rotating disk or drum, and the track of the second piston arrangement may be provided on a second rotating disk or drum. The common cylinder may be located between the first and second rotating disks or drums. Preferably the common cylinder is located between first and second disks which are spaced apart along a common axis of rotation. Alternatively the common cylinder may be located between an inner shaft or drum providing the track of one of the first and second piston arrangements and a hollow outer drum arranged coaxially with the inner shaft or drum and providing the track of the other one of the first and second piston arrangements. The inner drum may be hollow and other engine components may be packaged within the hollow inner drum.

In a first arrangement according to the third aspect of the invention, the common cylinder comprises an intake port, an exhaust port and a spark plug or fuel injector. The intake and exhaust ports may be spaced apart from each other along a longitudinal axis of the common cylinder, and the spark plug or fuel injector may be located at an intermediate position between the intake port and the exhaust port.

The internal combustion engine of the first arrangement may function according to the following operating cycle: a) an intake phase in which the first and second piston heads are located one on either side of the intake port and the second piston head moves away from the first piston head in a first direction parallel to the common cylinder axis such that the volume of the chamber is increased and charge is drawn into the chamber; then b) a compression phase in which the first piston head moves in the first direction towards the second piston head such that the volume of the chamber is decreased and the charge is compressed; then c) a power phase in which the charge burns and the second piston head moves in the first direction away from the first head and extracts work; then d) an exhaust phase in which the first and second piston heads are located one on either side of the exhaust port and the first piston head moves in the first direction towards the second piston head such that the volume of the chamber is decreased and the burnt charge is expelled from the chamber via the exhaust port; then e) a recovery phase in which the first and second piston heads both move in a second direction parallel and opposite to the first direction back towards the intake port in preparation for the intake phase of the following cycle.

The operating cycle may further include a steam phase in which water and/or steam is injected into the chamber and work is extracted by the first and/or second piston heads. The steam phase may occur during the power phase and/or between the exhaust phase and the recovery phase.

In a second arrangement according to the third aspect of the invention, the common cylinder comprises an intake port and an exhaust port at a substantially similar location along a longitudinal axis of the common cylinder. The intake and exhaust ports may be spaced apart on opposite sides of the common cylinder but at a similar height along the cylinder axis. Alternatively the intake and exhaust ports may comprise a single combined intake and exhaust port operated by a valve as described in relation to the eighth aspect of the invention.

The internal combustion engine of the second arrangement may function according to the following operating cycle: a) an intake phase in which an inlet valve in the bore of the common cylinder is open and the first piston head moves in a first direction away from the second piston head and the second piston head moves in a second direction away from the first piston head thereby drawing charge into the chamber formed between the first and second pistons; b) a compression phase in which the first piston head moves in the second direction towards the second piston head and the second piston head moves in the first direction towards the first piston head thereby compressing the charge; c) a power phase in which the first piston head moves in the first direction away from the second piston head and the second piston head moves in the second direction away from the first piston head thereby extracting work; and d) an exhaust phase in which an exhaust valve in the bore of the common cylinder is open and the first piston head moves in the second direction towards the second piston head and the second piston head moves in the first direction towards the first piston head thereby expelling the burnt charge from the chamber. Combustion may be initiated by spark ignition, compression ignition or homogeneous charge compression ignition. A steam phase may be included either during the power phase or in a separate steam power stroke after the exhaust phase.

The internal combustion engine of the third aspect of the invention may comprise a compression cylinder linked to the common cylinder by a transfer valve instead of an inlet port as recited above. The compression cylinder may be adapted to compress a charge and supply the charge to the common cylinder. The compression cylinder may be operated by a piston arrangement according to the first aspect of the invention. Alternatively the compression cylinder piston may be operated by a crankshaft and con rod arrangement or by a cam and follower arrangement and any other known piston actuation mechanism.

Where the internal combustion engine includes a compression cylinder, it may function according to the following operating cycle: a) a charging phase in which the transfer valve is open and the compression cylinder is operated to transfer pressurised charge into the chamber in the common cylinder formed between the first and second piston heads; b) a power phase in which the charge burns and the first piston head moves in a first direction away from the second piston head and extracts work and the second piston head moves in a second direction away from the first piston head and extracts work; and c) an exhaust phase in which the first piston head moves in the second direction towards the second piston head and the second piston head moves in the first direction towards the first piston head thereby expelling the burnt charge via an exhaust valve formed in a bore of the common cylinder. The charge may comprise air (if the engine operates by fuel injection) or a fuel/air mixture. The compressed charge may be ignited by a spark plug located in the bore of the common cylinder, or alternatively by compression. Compression ignition may be achieved by movement of the first piston head towards the second piston head and/or movement of the second piston head towards the first piston head with the transfer valve closed. The transfer valve may be a three position valve having a closed position in which the valve is sealed so that substantially no fluid can move into or out of the common cylinder via the transfer valve, an intake position in which charge can be transferred from the compression cylinder into the common cylinder, and an exhaust position in which burnt charge can be transferred from the common cylinder to an exhaust duct.

A fourth aspect of the invention provides an internal combustion engine comprising a combustion cylinder operated by a first piston arrangement according to the first aspect of the invention and a compression cylinder operated by a second piston arrangement according to the first aspect of the invention, wherein the compression cylinder is adapted to receive a charge, compress the charge, and deliver the compressed charge to the combustion cylinder.

The compression cylinder may be connected to the combustion cylinder by a transfer valve which may be selectively openable such that fluid flow from the compression cylinder into the combustion cylinder via the transfer valve is enabled and closable such that fluid flow through the transfer valve is not enabled. The transfer valve may be connected to the combustion cylinder via a port in the bore or the head. The transfer valve may be a three position valve as described above also adapted to function as an exhaust valve. The transfer valve may comprise a sliding or rotating valve member or a butterfly valve. A swirl inducing device may be included in the transfer valve or between the transfer valve and the combustion cylinder.

An internal combustion engine according to the fourth aspect of the invention may function according to the following operating cycle: a) a charging phase in which the transfer valve is open and the compression cylinder is operated to transfer pressurised charge into the combustion cylinder while the piston head of the first piston arrangement is at or near a top dead centre position; b) a power phase in which the charge burns and the piston head of the first piston arrangement is moved towards a bottom dead centre position and extracts work; and c) an exhaust phase in which the piston head of the first piston arrangement moves towards a top dead centre position thereby expelling the burnt charge from the combustion cylinder via an exhaust valve.

The operating cycle may further comprise a steam phase in which water and/or steam is injected into the chamber and work is extracted by the piston head of the first piston arrangement. The steam phase may occur during the power phase and/or during an additional steam cycle phase between the exhaust phase and the following induction phase. If the steam phase occurs during the power phase the water and/or steam may be injected into the combustion cylinder part way through the piston stroke from top dead centre to bottom dead centre. If the engine is adapted to run using HCCI ignition the water and/or steam is introduced after auto-ignition of the fuel/air mixture and after the majority of the fuel in the fuel/air mixture has burnt. If the steam phase occurs during an additional steam cycle phase then the engine expels substantially all of the burnt charge during an exhaust phase, and the piston then moves away from top dead centre in a separate steam power phase. In the steam power phase the water and/or steam is injected into the combustion cylinder and evaporates and expands, thereby doing work on the piston head and cooling the engine. Following the steam power phase, the piston head moves back towards top dead centre, thereby expelling the steam from the combustion cylinder through the exhaust valve or through a separate steam collection valve. The steam may be collected and recirculated. The power stroke of the steam power phase may be shorter than the power stroke of the main power phase. This may be achieved by a track shape having two different local minima corresponding to two different bottom dead centre positions of the piston head at different displacements.

The combustion cylinder and compression cylinder may be located between a hollow outer drum and an inner drum or shaft, wherein the outer drum and the inner drum or shaft are adapted to rotate relative to the combustion and compression cylinders, wherein the track of the first piston arrangement is provided on an inner surface of the outer drum. Cam surfaces and/or tracks for driving intake valves, exhaust valves and/or the transfer valve may be provided on the inner drum or shaft. Preferably the track of the second piston arrangement is also provided on the inner surface of the outer drum. The cylinders may be arranged substantially radially between the outer drum and the inner drum or shaft. The inner drum may be hollow and other engine components may be packaged within the hollow inner drum.

The compression cylinder may be connected to the combustion cylinder by a transfer cylinder which is fluidically connected to the combustion cylinder, wherein a transfer piston is moveable in reciprocating motion within the bore of the transfer cylinder to open and close a transfer port connecting the compression piston to the transfer piston thereby controlling the flow of compressed charge into the combustion cylinder. The transfer cylinder may have a bore which opens into the head of the combustion cylinder. Alternatively the transfer piston may have a ported connection to the combustion cylinder with an opening in the head or in the bore of the combustion cylinder.

A fifth aspect of the invention provides an homogeneous charge compression ignition internal combustion engine comprising a combustion cylinder, a compression ignition cylinder which is fluidically connected to the combustion cylinder, and a compression ignition piston moveable in reciprocating motion within the compression ignition cylinder; wherein the compression ignition piston is adapted to be moved between a bottom dead centre position corresponding to a maximum volume of the compression ignition cylinder to a top dead centre position corresponding to a minimum volume of the compression ignition cylinder during operation of the engine to create a pressure spike within the combustion cylinder thereby causing auto ignition of a fuel/air mixture within the combustion cylinder.

The compression ignition cylinder may have a bore which opens into a head of the combustion cylinder. Alternatively the compression ignition cylinder may be fluidically connected to the combustion cylinder by a port having an opening in the bore or head of the combustion cylinder. The compression ignition piston may be operated by a track system according to the first aspect of the invention, or alternatively by a cam and follower arrangement or any other type of actuator. The cam surface or track which operates the compression ignition piston may be provided on a rotating disk or drum which also provides one or more other tracks and/or cam surfaces used to drive other engine components. The cam surface or track which operates the compression ignition piston may be moveable with respect to the disk or drum on which it is mounted to allow the timing of the compression ignition piston to be varied with respect to the piston of the combustion cylinder. The auto-ignition timing may therefore be varied during operation of the engine according to the operating conditions and requirements. The compression ignition cylinder arrangement may be used in conjunction with any of the other aspects of the invention.

The compression ignition piston may be adapted to move from its bottom dead centre position to its top dead centre position and back to its bottom dead centre position at least once for every combustion cycle of the engine.

A single piston and cylinder arrangement may function both as a transfer cylinder and a compression ignition cylinder.

A sixth aspect of the invention provides an internal combustion engine comprising a combustion chamber, and intake system, an exhaust system and a three-way valve fluidically connected to the combustion chamber via a port and further fluidically connected to the intake system and the exhaust system, wherein the three-way valve has a first position in which fluid is substantially prevented from flowing into or out of the combustion cylinder via the three-way valve, a second position in which the intake system is fluidically connected to the combustion chamber such that charge can be introduced to the combustion chamber through the port via the three-way valve, and a third position in which the intake exhaust system is fluidically connected to the combustion chamber such that burnt charge can be expelled from the combustion chamber to the exhaust system through the port via the three-way valve.

The skilled person will appreciate that the various aspects of the invention may be used alone or in combination with each other. Several examples of different embodiments are shown in the drawings and described in detail but the skilled person will appreciate that other combinations are possible.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
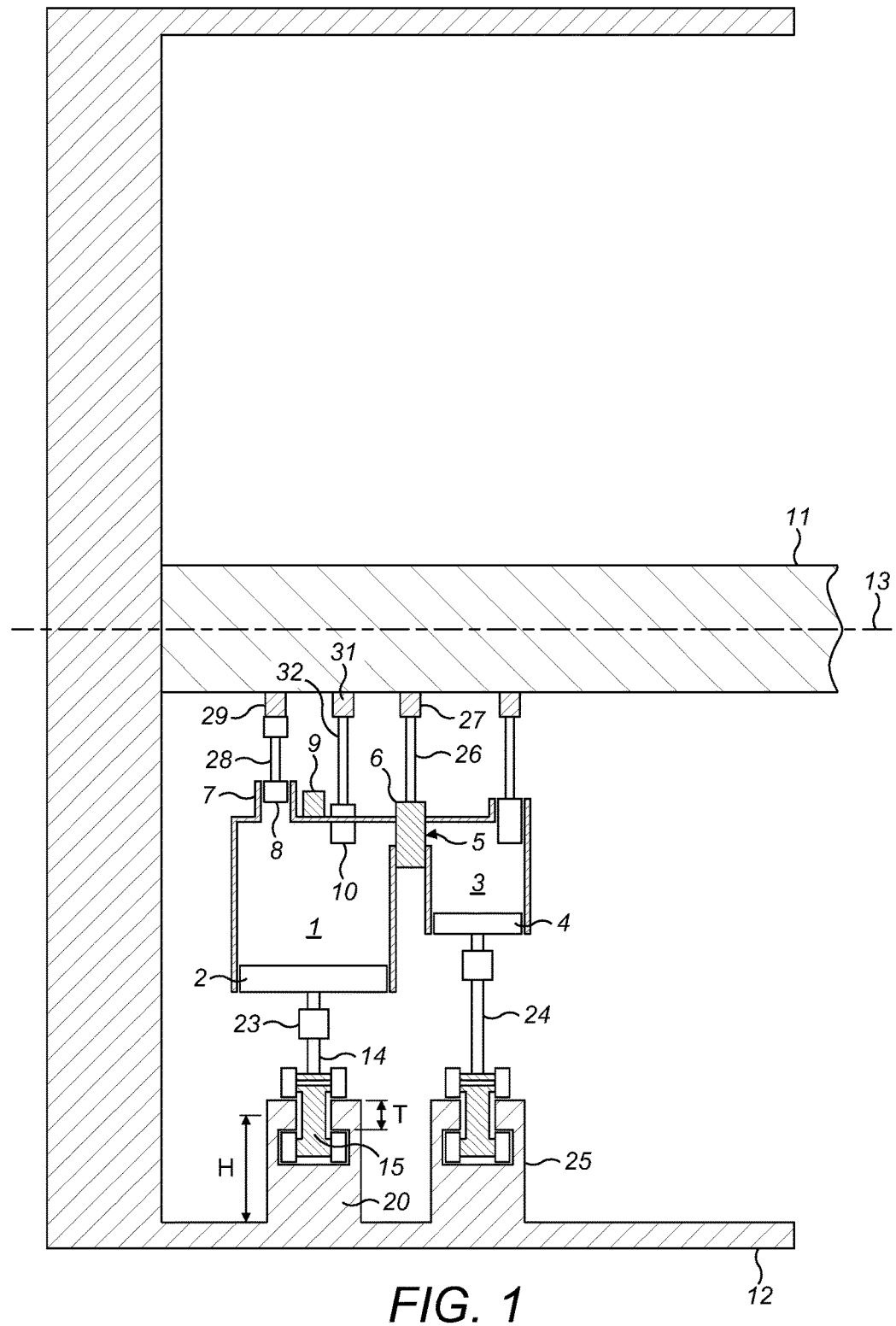
FIG. 1 shows a cross section through an engine according to a first embodiment of the invention.

FIG. 1 shows a cross section taken through an internal combustion engine according to a first embodiment of the invention. The engine comprises a combustion cylinder 1 having a main piston 2 which reciprocates within the combustion cylinder, and a compression cylinder 3 having a compression piston 4 which reciprocates within the compression cylinder. The compression cylinder 3 is fluidically connected to the combustion cylinder 1 by a transfer duct 5 which is operated by a transfer valve 6 to open and close the transfer duct.

The engine further comprises an HCCI compression ignition cylinder 7 having an HCCI compression ignition piston which reciprocates within the HCCI compression ignition cylinder. The HCCI compression ignition cylinder 7 has an open end which opens into the head wall or upper wall of the combustion cylinder 1. The engine further comprises a water and/or steam injector device 9 adapted to inject water and/or steam into the combustion cylinder through the head wall, and an exhaust port 10 formed in the bore of the combustion cylinder operated by an exhaust valve.

The above-mentioned components and systems are all located between a central shaft 11 and a hollow outer drum 12. The shaft 11 and drum 12 are rotationally fixed with respect to each other by a linking wall 11a but are adapted to rotate with respect to the engine cylinders about a central axis of the engine 13. The engine may comprise any number of similar piston arrangements arranged radially between the shaft 11 and the drum spaced apart circumferentially around the central axis 13. For increased clarity only one arrangement is shown in the drawings and described in detail.

The main piston 2 is connected to a con rod 14 which is slidably received in a fixed sleeve 23 which constrains the con rod to move substantially only in a direction aligned with the combustion cylinder axis without significant rotation with respect to the main piston 2. The con rod is coupled at its opposite end to a bogie 15, shown in more detail in FIG. 2, which carries a first pair of bearings acting as wheels 16a, 16b on a first side of the bogie and a second pair of bearings acting as wheels 17a, 17b on a second side of the bogie. The upper wheels 16a, 17a are mounted on a first axle 18 and the lower wheels 16b, 17b are mounted on a second axle 19. It should be noted that the terms upper and lower are used for illustrative purposes only and the actual spatial location of the wheels will vary according to the orientation of the engine. The con rod 14 is connected to the bogie 15 at the first shaft 18, and the bogie is rotatable about the axis of the first shaft 18 with respect to the con rod.

The bogie 15 and its wheels 16a, 16b, 17a, 17b are received in a track 20 mounted to the inner surface of the drum 12 and extending around the circumference of the drum in a continuous closed loop. The track 20 includes a first arm carrying a projecting portion 21 which extends between the first pair of wheels 16a, 16b and a second arm carrying a projecting portion 22 which extends between the second pair of wheels 17a, 17b. The projecting portions 21, 22 engage the upper wheels 16a, 17a such that the track can push the piston in a direction extending away from the track under the action of the rotating track and the piston can push the track such that the track rotates under the action of the reciprocating piston moving towards the track. Similarly the projecting portions 21, 22 engage the lower wheels 16b, 17b such that the track can pull the piston in a direction extending towards the track under the action of the rotating track and the piston can push the track such that the track rotates under the action of the reciprocating piston moving away from the track. The upper wheels are required to transmit greater loads than the lower wheels and so are larger and stronger.

The projecting portions have a height H in a direction extending away from the inner surface of the drum 12 which varies around the circumference of the track 20 such that, as the drum rotates thereby moving the track relative to the combustion cylinder 1, the main piston 2 moves in reciprocating motion within the combustion cylinder along its axis in accordance with the varying height H of the track. The height H of the track 20 has a non-sinusoidal shape with respect to the angle of rotation of the drum 12 such the main piston 2 does not follow simple harmonic motion with respect to the angle of rotation of the track.

Figure 3A:
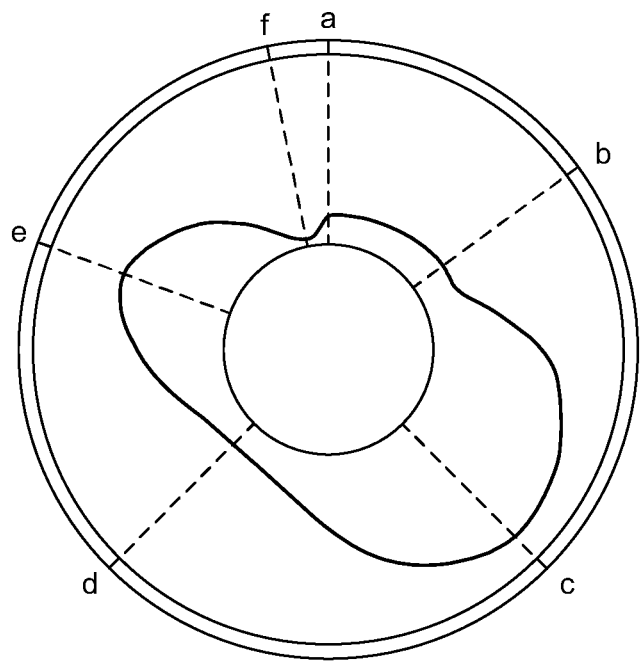
FIGS. 3a and 3b show schematic representations of a track from the engine shown in FIG. 1.
Figure 3B:
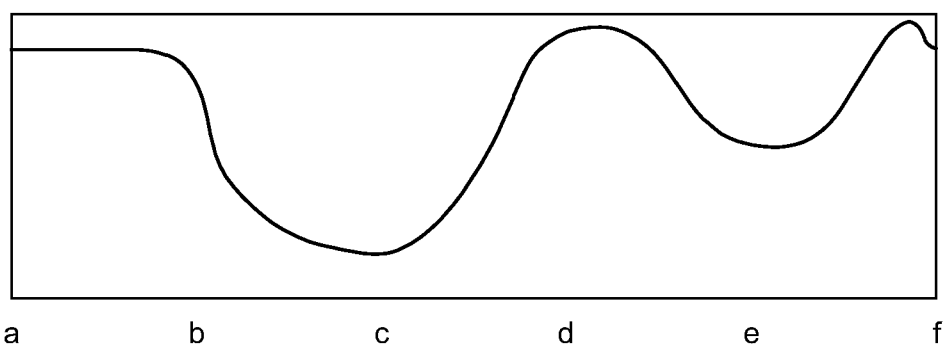

The approximate path of the track is shown in FIGS. 3a and 3b. The size of the track has been exaggerated and other components have been omitted from these figures to more clearly illustrate the changes in the height of the path of the track corresponding to the different phases of the engine cycle. The actual track leaves sufficient space inboard of its inner-most point to allow one or more of the piston arrangements as shown in FIG. 1 to be arranged radially within the confines of the track. FIG. 3a shows the shape of the track 20 as it would appear when viewed from a direction aligned with the engine axis 13, and FIG. 3b shows how the shape of the track would appear if the track could be unwound from its curved shape to more clearly illustrate the track path. The reasons for the shape of the track will become apparent in view of the engine operating cycle described below. The track shown in FIG. 3a has a continuous path shape corresponding to a single engine cycle for each complete revolution of the track. In other embodiments, a track may have a path shape corresponding to multiple cycles for each revolution of the track. It should be noted that since the wheels 16a, 16b, 17a, 17b are mounted on a rotating bogie the projecting portions can have a constant (or approximately constant) thickness T around the circumference of the track.

The compression piston 4 is coupled via a con rod 24 to a second track 25 also provided on the inner surface of the drum 12. The transfer valve 6, HCCI compression ignition piston 8 and exhaust valve are each coupled via respective con rods 26, 28, 30 to respective tracks 27, 29, 31 provided on the outer surface of the shaft 11. The coupling arrangements and drive mechanisms of the compression piston 4, the transfer valve 6, the HCCI compression ignition piston 8 and the exhaust valve are each similar to that described in relation to the main piston 2 and so are not shown or described separately in detail.

The track 27 of the HCCI compression ignition piston arrangement is arranged to be rotated on the shaft 11 in use to vary the position of the HCCI compression ignition piston track with respect to the other tracks 20, 25, 29, 31. For example, the HCCI compression ignition piston arrangement track may be held stationary in a first position during a first period of operation of the engine, and then rotated about the central axis 13 by a required number of degrees to advance or retard operation of the HCCI compression ignition piston by that amount and held stationary in its new position for a second period of operation. This allows the timing of the HCCI compression ignition piston 8 to be varied compared to the other pistons such that ignition timing may be varied according to the operating conditions of the engine. Movement of the track may be controlled by any suitable actuation system, for example a rack and pinion system. Operation of the HCCI compression ignition piston is explained below.

Figure 4A:
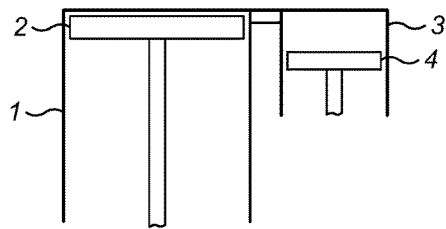
FIGS. 4a to 4f show schematic views of the operating cycle of the engine of FIG. 1.
Figure 4B:
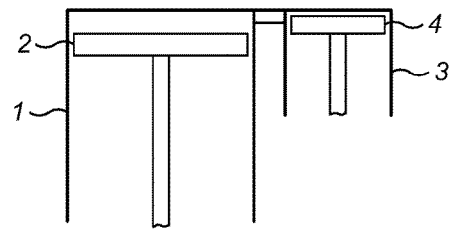
Figure 4C:
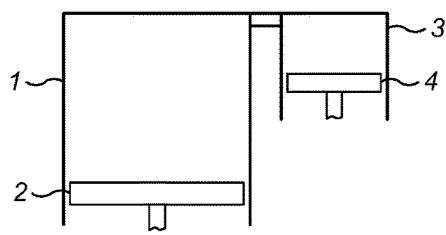
Figure 4D:
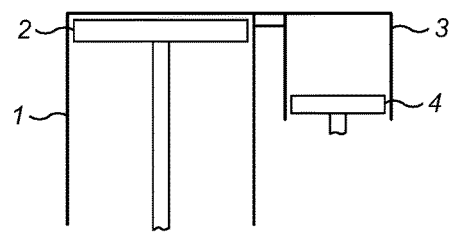
Figure 4E:
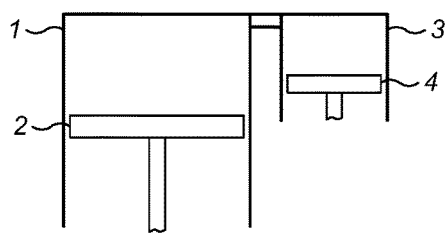
Figure 4F:
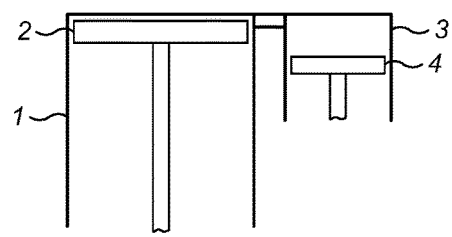

The engine functions according to the following operating cycle:

a) a charging phase in which charge is transferred from the compression cylinder 3 into the combustion cylinder 1 via the transfer duct 5 while the main piston 2 is at or near a top dead centre or TDC position (FIGS. 4a to 4b);

b) a power phase in which the charge burns and the main piston 2 is moved towards a bottom dead centre or BDC position and extracts work (FIGS. 4b to 4c);

c) an exhaust phase in which the main piston 2 moves back towards a TDC position thereby expelling the burnt charge from the combustion cylinder via the exhaust port 10 (FIGS. 4c to 4d);

d) a secondary steam power phase in which steam and/or water is injected into the combustion cylinder by the injector device 9 and the main piston 1 is moved towards a BDC position and extracts work (FIGS. 4d to 4e); and e) a steam recovery phase in which the main piston 2 moves back towards a TDC position thereby expelling the expanded steam from the combustion cylinder back to the steam injector device 9 which recirculates the steam for use in a following steam cycle (FIGS. 4e to 4f).

During the charging phase, the transfer valve 6 is open, the main piston 2 remains at or near TDC after completion of the previous steam recovery phase, and the compression piston 4 is approaching TDC having compressed a homogeneous charge of well mixed fuel and air. The tracks 20 and 25 of the main piston arrangement and the compression piston arrangement each have a prolonged portion of low or zero gradient corresponding to this phase of the operating cycle such that the main piston 2 and the compression piston 4 each experience a substantial period of dwell time, thereby allowing a more complete transfer of compressed charge into the combustion cylinder 1.

Following charging of the combustion cylinder 1, the transfer valve 6 closes thereby sealing the combustion cylinder 1, and the HCCI compression ignition piston moves from a BDC position (that is an outer position with respect to the combustion cylinder corresponding to a maximum volume of the HCCI compression ignition cylinder) into a TDC position (that is an inner position further towards or even extending into the combustion chamber corresponding to a minimum volume of the HCCI compression ignition cylinder) thereby reducing the overall volume of the combustion chamber and causing a rapid increase in pressure. The rapid increase in pressure causes auto ignition of the homogeneous fuel/air mixture and the main piston 2 moves towards a BDC position in a power stroke (see FIGS. 4b to 4c) in which the main piston extracts work and drives the drum 12 via the track 20, thereby transferring work to the shaft 11 in the power phase. The HCCI compression ignition piston 8 may be actuated shortly after the main piston 2 has started to move away from its TDC position such that it is already moving towards BDC when peak pressure occurs. The track 20 is steeper over the first part of the power stroke such that piston speed is higher during the first half of the stroke when cylinder pressure is highest. At a point after auto ignition of the fuel/air mixture (when substantially all the fuel has burnt) the injector device 9 injects water and/or steam into the combustion cylinder 1, which evaporates and expands, thereby cooling the engine and doing further work on the main piston 2 which is transferred to the shaft via the track 20 and drum 12 until the main piston reaches a BDC position (FIG. 4c). During the power phase the compression piston 4 moves towards a BDC position thereby drawing fresh charge into the compression cylinder 3.

At the end of the power phase, after the main piston 2 has reached BDC (FIG. 4c), the exhaust valve opens the exhaust port and the track pushes the main piston 2 back towards TDC in the exhaust phase, thereby scavenging the combustion cylinder of burnt fuel and air and expanded vapour from the steam phase (FIGS. 4c to 4d).

At the end of the exhaust phase when the main piston 2 is at or near TDC (FIG. 4d) the exhaust valve closes and steam and/or water is injected into the combustion cylinder for a second time by the injector device 9. Again, the steam and/or water evaporates and expands, thereby cooling the engine and doing further work on the main piston which moves away from TDC (FIGS. 4d to 4e) in a secondary steam power phase towards a second BDC position. The second BDC position is at a different location to the first BDC position reached at the end of the main power phase since the piston displacement required for the secondary steam power phase is less than that required for the combined combustion and steam power phase. The different BDC positions are made possible by a track shape including a first local minimum at a first height H corresponding to the BDC position at the end of the combined combustion and steam power phase and a second local minimum at a second height H different to the first corresponding to a different BDC position at the end of the secondary steam power phase. Following the secondary steam power phase the main piston then moves back towards TDC (FIG. 4f) in a steam recovery phase scavenging the combustion cylinder of the expanded vapour from the secondary steam power phase. The expanded steam is collected by the injector device 9 (or alternatively via a separate steam exhaust port) so that it can be recirculated and used in further steam cycles.

Following the steam recovery phase, the main piston 2 is at or near TDC and ready to begin the next engine cycle, starting with the following charging phase and moves slightly away from TDC to create space in the combustion cylinder 1 for fresh compressed charge. During the power phase, exhaust phase, secondary steam power phase and steam recovery phases of the main piston 2, the compression piston 4 continues to move towards a BDC drawing charge into the compression cylinder via an inlet port. An inlet valve closes around BDC and the compression piston then moves back towards its TDC position, thereby compressing the charge. The track 25 includes significant portions of low or zero gradient corresponding to the BDC and TDC positions to allow time for a more complete transfer of charge into the compression cylinder during its intake phase and from the compression cylinder into the combustion cylinder during the charging phase. The compression piston 4 approaches TDC around the time the main piston 2 finishes the steam recovery phase, so that the transfer valve 6 may be opened to transfer the compressed charge into the combustion cylinder 1 in the charging phase of the following engine cycle.

In the above-described embodiment the engine is an HCCI compression ignition type engine including a dedicated HCCI compression ignition piston. In alternative embodiments the engine may not include this extra piston and ignition may be achieved by compression under the action of the main piston 2 alone, or by a spark plug mounted in the head of the combustion cylinder 1. Where ignition is achieved by compression under the action of the main piston alone the main piston may slow or pause its travel towards TDC or even briefly reverse its direction of travel to allow charge to be transferred into the combustion chamber 1, before performing a rapid movement towards TDC after the transfer valve 6 has closed to create the required final increase in pressure to cause ignition of the charge.

Figure 2:
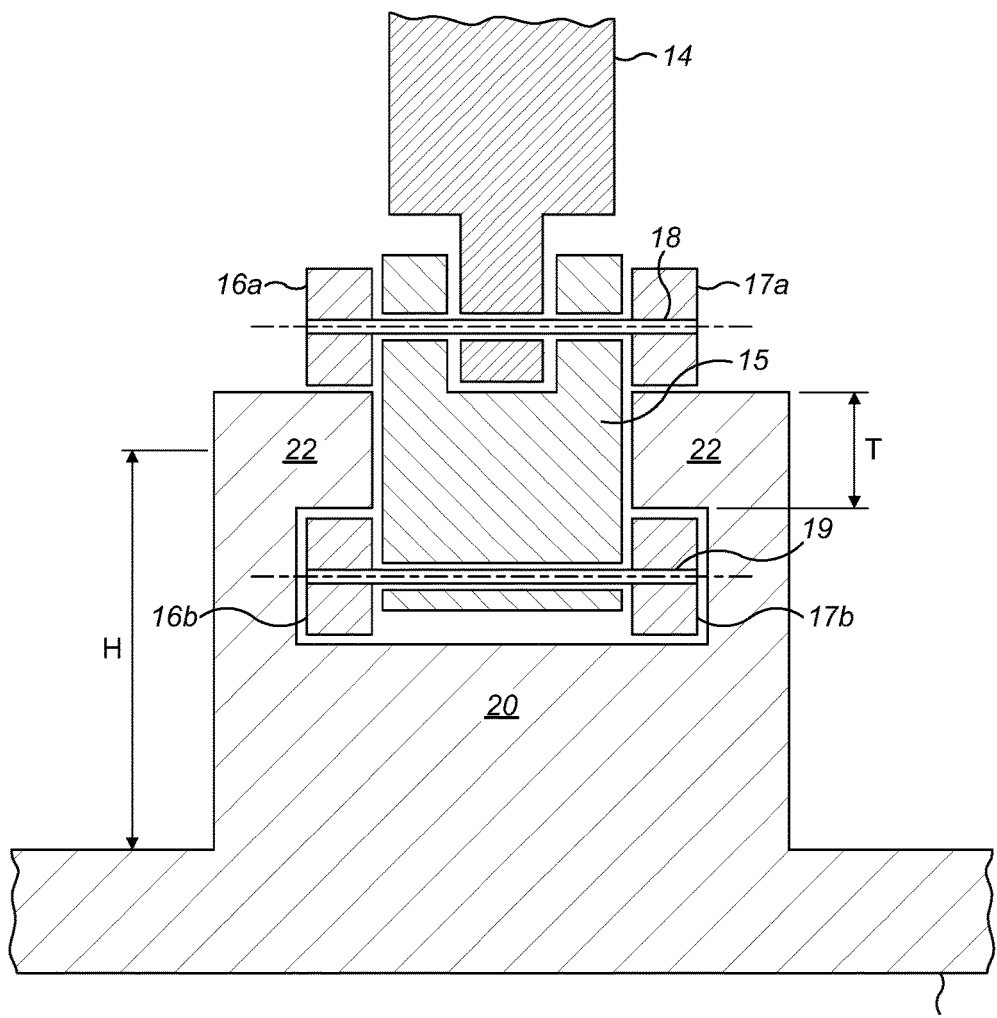
FIG. 2 shows the con rod to track interface of FIG. 1 in greater detail.
Figure 5A:
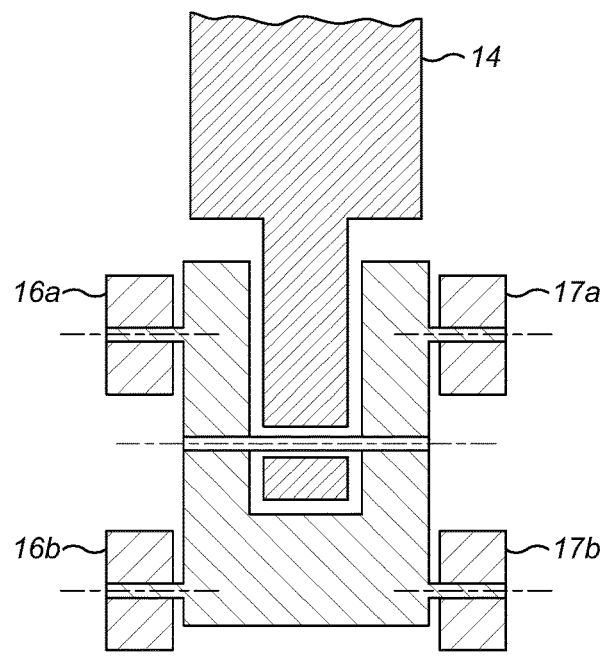
FIGS. 5a to 5e show alternative con rod to track coupling arrangements.
Figure 5B:
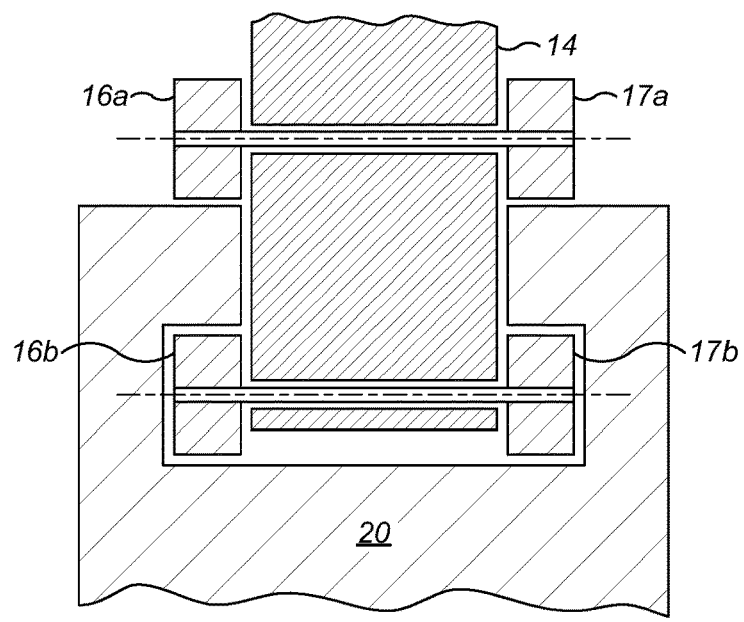
Figure 5C:
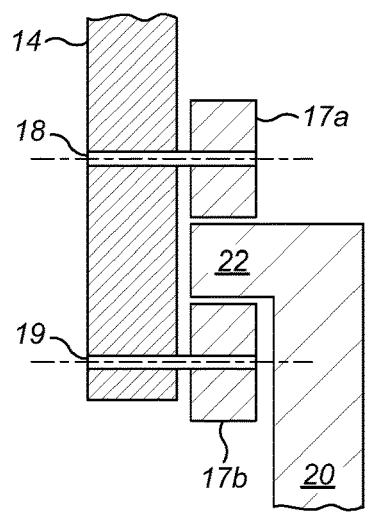
Figure 5D:
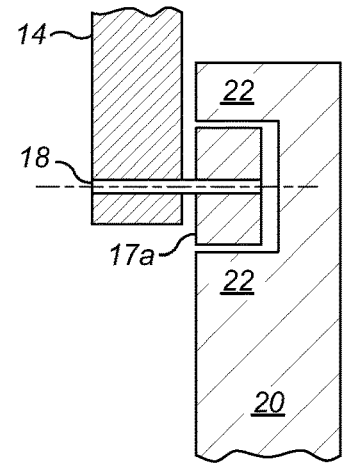
Figure 5E:
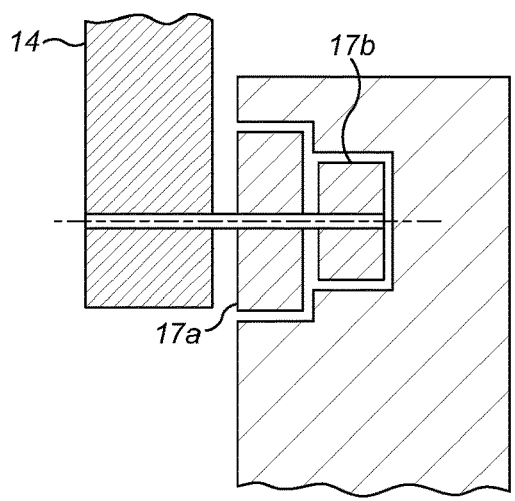

In the above-described embodiment the con rod 14 is coupled to the track by a bogie arrangement 15 with pairs of longitudinally spaced wheels on each side of the bogie, as shown in FIG. 2. In alternative embodiments the wheels 16a, 16b, 17a, 17b may be coupled to the bogie 15 on spindles and the con rod 14 may be mounted by a separate shaft, as shown in FIG. 5a. Alternatively the wheels may be attached directly to the con rod, as shown in FIG. 5b. In this case the thickness T of the projecting portions 21, 22 of the track 20 will vary significantly along the length of the track as the gradient of the track changes to account for the distance between the upper 16a, 17a and lower 16b, 17b wheels. Alternatively wheels may provided only on one side of a bogie or con rod, as shown in FIG. 5c. Alternatively a bogie or con rod may not include longitudinally spaced pairs of wheels each sandwiching a projecting portion of a track but rather a single wheel may be employed on one or both sides of a bogie or con rod, as shown in FIG. 5d or concentric wheels may be employed on one or both sides of a bogie or con rod, as shown in FIG. 5e.

In the above-described embodiment the con rod 14 is substantially constrained to translational movement along the direction of the axis of the combustion cylinder by the sleeve 23. Alternatively or in addition a swinging arm may be pivotally attached to a fixed point in the engine and pivotally attached to the con rod 14, for example at the bogie 15 or near to the bogie. As well as helping to constrain movement of the con rod, a swinging arm may also be adapted to react some or most or substantially all of the side load exerted on the bogie arrangement by the track, thereby significantly reducing the load transferred to the con rod. A swinging arm may also have an oil delivery passage extending along its length which may be used to deliver lubricating oil to the various bearing surfaces located around the distal end of the con rod and the bogie arrangement.

The steam phases may provide sufficient cooling for the engine that no further cooling of the combustion cylinder 1 is required. The steam phases may be activated or disabled as required, for example if the engine is not running at a sufficiently high temperature for the steam phases to function adequately one or both of the steam phases may be disabled. In alternative embodiments the initial steam phase and/or the secondary steam power phase may be omitted. If the secondary steam power phase is omitted, the main piston 2 only performs 2 piston strokes per engine cycle instead of the four described above since the engine is ready to begin the next charging phase following completion of the exhaust phase.

In the above-described embodiment the transfer valve 6, the HCCI compression ignition piston 8 and the exhaust valve are all actuated by con rod and track arrangements as used for the main piston 2 and compression piston 4. In alternative embodiments one or more of the transfer valve 6, the HCCI compression ignition piston 8 and the exhaust valve may be actuated by any known alternative actuation system for valves or pistons.

Figure 6A:
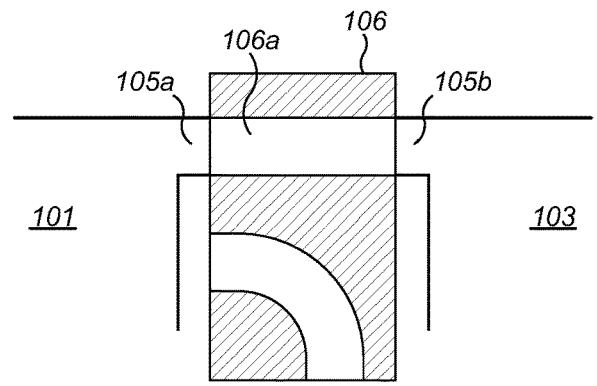
FIGS. 6a to 6c show a three way valve used in an alternative embodiment of the invention.
Figure 6B:
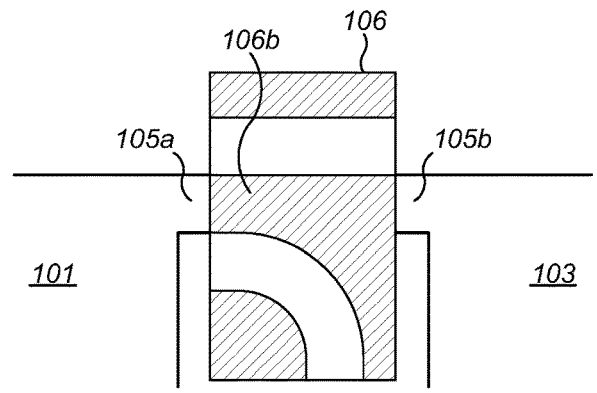
Figure 6C:
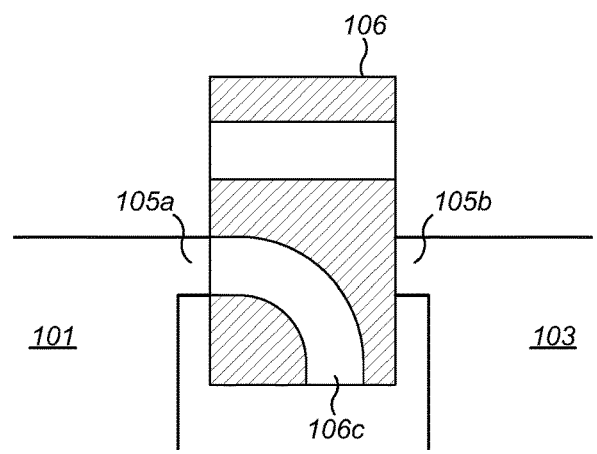

In the above-described embodiment the engine includes a transfer valve 6 in a transfer duct 5 connecting the compression cylinder 3 to the combustion cylinder 1 and also a separate exhaust port. In an alternative embodiment the transfer valve may be replaced by a three-way valve 106 (as shown in FIGS. 6a to 6c) allowing a single port to act as both an intake port and an exhaust port for a combustion cylinder 101. The valve 106 has a first position as shown in FIG. 6a in which a first duct 106a is aligned with the combined intake and exhaust port 105a of the combustion cylinder 101 and a transfer duct 105b of a compression cylinder 103 such that charge may be passed through the three-way valve from the compression cylinder into the combustion cylinder. The valve 106 further has a second position as shown in FIG. 6b in which a closing portion 106b is aligned with the combined intake and exhaust port 105a of the combustion cylinder 101 such that the combined intake and exhaust port is substantially sealed. The valve 106 further has a third position as shown in FIG. 6c in which a second duct 106c is aligned with the combined intake and exhaust port of the combustion cylinder 101 and opens into an exhaust system 110 such that burnt charge may be passed through the three-way valve from the compression cylinder into the exhaust system. In the embodiment shown in FIGS. 6a to 6c the valve moves linearly between its three positions and the closed position is located between the intake position and the exhaust positions, but in other embodiments the valve may rotate instead of translating and the intake, closed and exhaust positions may be in any order. This valve arrangement advantageously reduces the number of ports and valves required to operate a combustion cylinder, and may equally be applied to an engine arrangement without a dedicated combustion cylinder but instead having a conventional intake system which is fluidically connected to the combustion cylinder when the three-way valve is in its first position. It should be noted that the three way valve arrangement is not limited to use on an engine as shown in FIG. 1 but may generally be employed for any piston system where a piston is required to have both an inlet and an exhaust port.

Figure 7A:
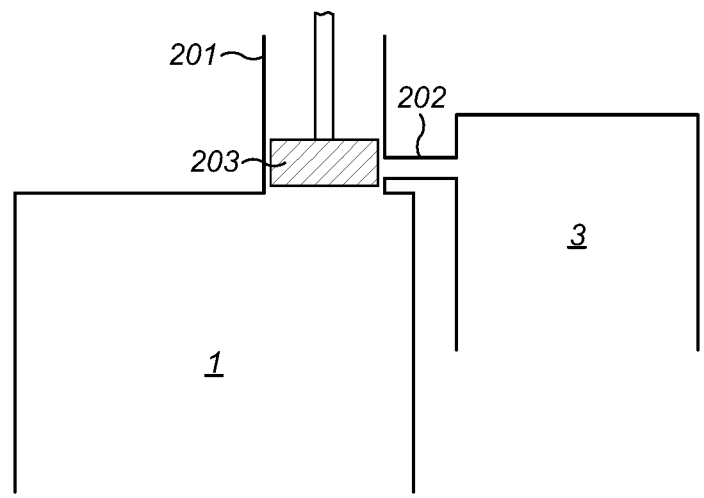
FIGS. 7a and 7b show schematic views of a transfer piston arrangement used in an alternative embodiment of the invention.
Figure 7B:
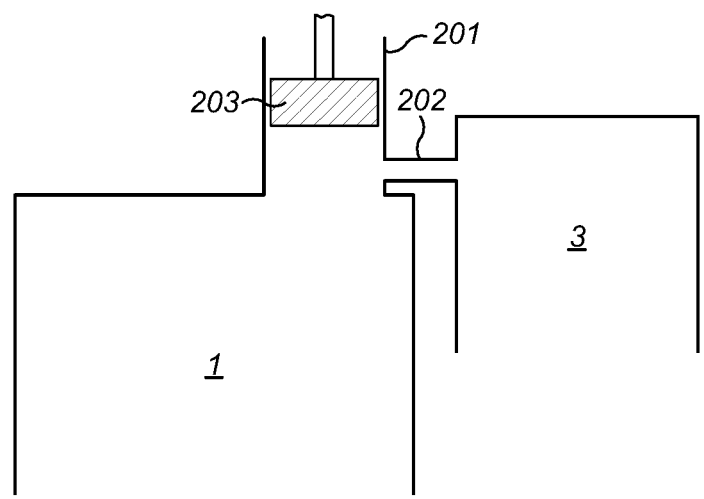
Figure 8:
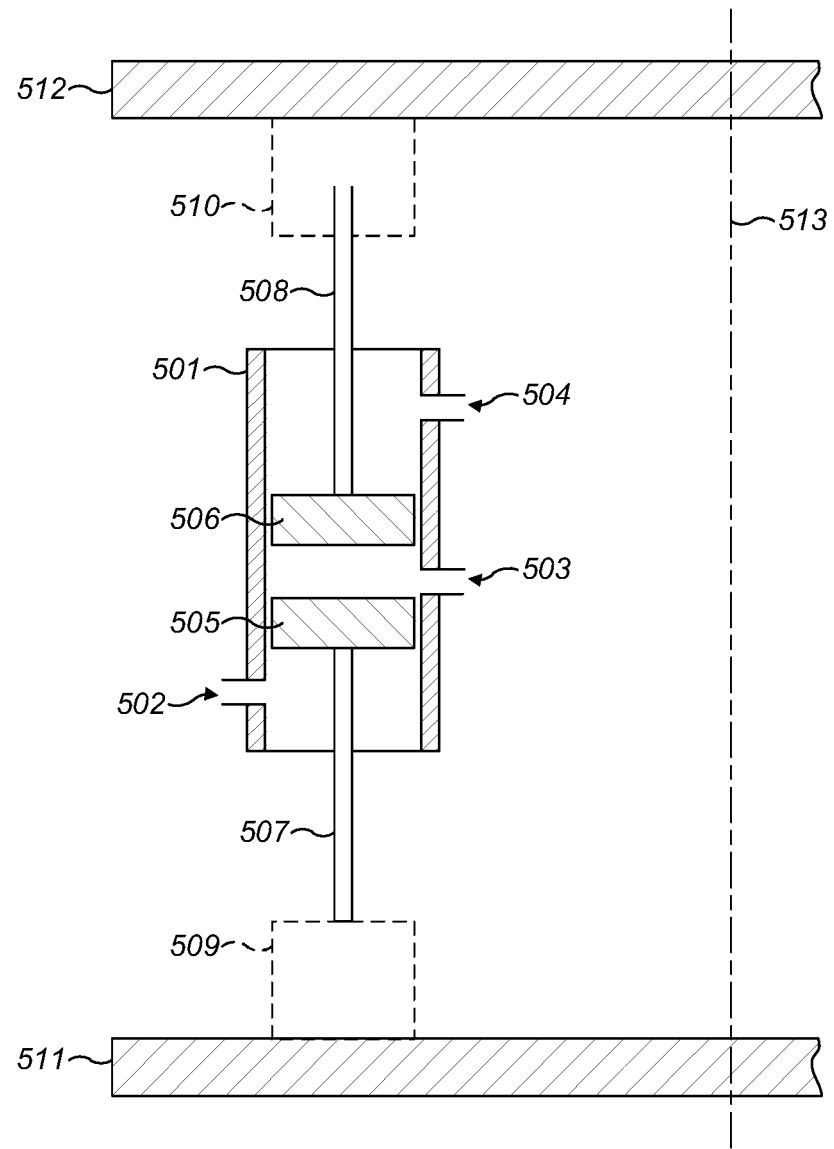
FIGS. 8 and 9a to 9f show an engine according to a second embodiment of the invention.

In the above-described embodiment the compression cylinder 3 is connected to the combustion cylinder 1 by a transfer duct 5 operated by a transfer valve 6. In alternative embodiments the transfer valve may be replaced by a transfer cylinder arrangement as shown in FIGS. 7a and 7b. The transfer cylinder 201 has a bore which opens into the head of the combustion cylinder 1 and a transfer port 202 fluidically connects the transfer cylinder to the compression cylinder 3. A transfer piston 203 is moveable in reciprocating motion within the bore of the transfer cylinder 201 to open and close the transfer port 202, thereby controlling the flow of compressed charge into the combustion cylinder. The transfer piston 203 moves between a TDC position as shown in FIG. 7a in which the transfer port 202 is sealed and a BDC position as shown in FIG. 7b in which the transfer port is open. The transfer piston 203 moves towards its BDC position to uncover the transfer port 202 thereby allowing compressed charge to flow from the compression cylinder 3 into the combustion cylinder 1 to initiate the charging phase. The transfer piston 203 then moves towards its TDC position to cover the transfer port 202 at the end of the charging phase, thereby sealing the combustion cylinder during its power phase(s) and exhaust phase(s) and sealing the compression chamber 3 during its intake and compression phases. The transfer piston may be adapted to function as an HCCI compression ignition piston with the final part of its movement towards its TDC position causing a pressure spike to initiate auto ignition of a homogeneous fuel/air mixture. In this case there is no need to include a separate HCCI compression ignition cylinder arrangement 7 as shown in FIG. 1. The transfer piston 203 may be actuated by a con rod and track mechanism similar to that described in relation to the main piston 2, or alternatively may be actuated by any other known piston actuation arrangement.

FIGS. 8 and 9a to 9f show schematic views of an internal combustion engine 500 according to a second embodiment of the invention. The engine 500 comprises common cylinder 501 having an intake port 502 formed in its bore, an exhaust port 503 formed in its bore and spaced apart from the intake port along a longitudinal axis of the common cylinder, and a spark plug 504 provided at an intermediate location between the intake port and the exhaust port. The engine 500 further comprises a first piston 505 moveable in reciprocating motion within the common cylinder and a second piston 506 also moveable in reciprocating motion within the common cylinder and opposing the first piston such that a combustion chamber is formed between the pistons. The first and second pistons 505, 506 are both connected via con rods 507, 508 to tracks 509, 510 provided on rotating disks 511, 512. The disks 511, 512 are rotationally fixed with respect to each other and rotate relative to the common cylinder 501 about a central axis of the engine 513. Rotation of the disks 511, 512 drives the pistons 505, 506 during some phases of the operating cycle the disks 511, 512 are driven by linear motion of the pistons in other phases, as will become apparent with reference to the following description of an operating cycle. The con rod and track arrangements of the first and second pistons are similar to those already described in relation to the main piston arrangement in the first embodiment of the invention and so are not shown or described in detail. The shapes of the tracks 509, 510 are, however, significantly different to the shape of the track 20 used for the main piston in the first embodiment due to the different piston displacement profiles required for each of the first and second pistons.

Figure 9A:
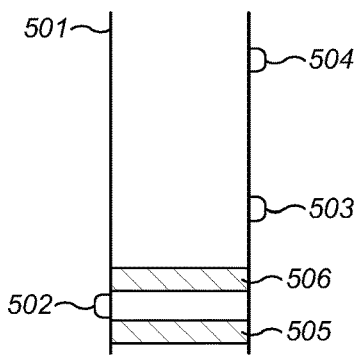
Figure 9B:
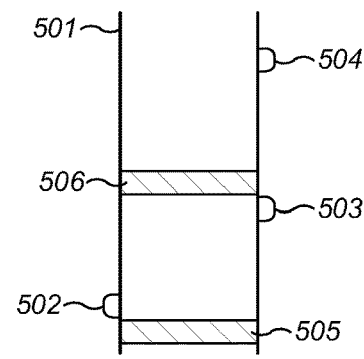
Figure 9C:
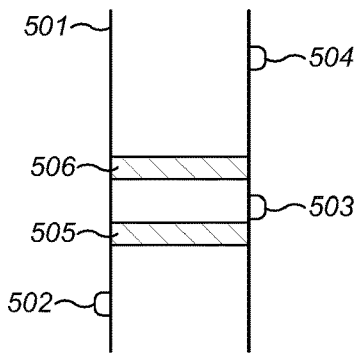
Figure 9D:
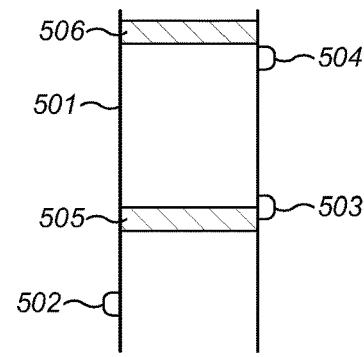
Figure 9E:
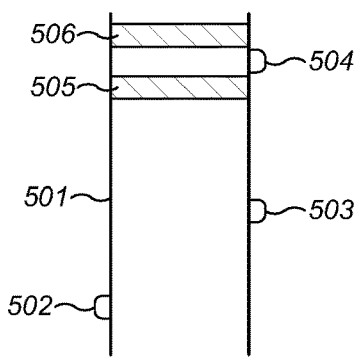
Figure 9F:
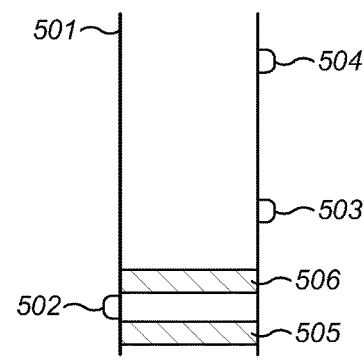

The engine 500 of the second embodiment functions according to the following operating cycle:

a) an intake phase in which the first and second pistons 505, 506 are located on alternate sides of the intake port 502 and the second piston 506 moves away from the first piston 505 in a first direction parallel to the common cylinder axis such that the volume of the chamber is increased and charge is drawn into the chamber (FIGS. 9a to 9b); then b) a compression phase in which the first piston 505 moves in the first direction towards the second piston 506 such that the volume of the chamber is decreased and the charge is compressed (FIGS. 9b to 9c); then c) a power phase in which the charge burns following ignition by the spark plug 504 and the second piston 506 moves in the first direction away from the first piston 505 and extracts work (FIGS. 9c to 9d); then d) an exhaust phase in which the first and second pistons 505, 506 are located on alternate sides of the exhaust port 504 and the first piston 505 moves in the first direction towards the second piston 506 such that the volume of the chamber is decreased and the burnt charge is expelled from the chamber via the exhaust port (FIGS. 9d to 9e); then e) a recovery phase in which the first and second pistons 505, 506 both move in a second direction parallel and opposite to the first direction back towards the intake port 502 in preparation for the intake phase of the following cycle (FIGS. 9e to 9f).

The use of the above described con rod and track power transfer mechanism allows the first and second pistons 505, 506 to follow unusual displacement profiles (which would not be possible with conventional power transfer mechanisms such as crank shaft and con rod mechanisms) thereby enabling the above operating cycle. In this case the first piston 505 is slow or stationary around BDC at the start of the cycle and during the intake phase, moves in the first direction during the compression phase, slows significantly (or even pauses or moves slightly in the second direction) during the power phase, moves in the first direction in the exhaust phase, and then moves in the second direction in the recovery phase. During the power phase the first piston moves more slowly than during the compression and exhaust phases, thus experiencing a period of reduced piston speed compared to its speed during the compression and exhaust phases.

The operating cycle may further include a steam phase in which water and/or steam is injected into the chamber and work is extracted by the first and/or second piston heads. The steam phase may occur during the power phase and/or between the exhaust phase and the recovery phase. If a steam phase occurs during the power phase then a water and/or steam injector is provided in the bore of the common cylinder 501 at a location between the spark plug 503 and the exhaust port 504. In this case water and/or steam is injected into the combustion chamber as the second piston 506 is moving away from the first piston 505 and extracting work, and the water and/or steam evaporates and expands thereby doing further work on the second piston and cooling the engine. If a steam phase occurs after the exhaust phase then a water and/or steam injector is provided in the bore of the common cylinder at a location above the exhaust port. In this case, following the exhaust phase the second piston 506 moves away from the first piston and water and/or steam is injected into the chamber, evaporating and expanding thereby doing further work of the second piston and cooling the engine. In this case the expanded steam may be recollected via a steam collection port and recirculated. Following the additional steam phase both pistons then return to their starting point in a recovery phase.

In an alternative embodiment the engine 500 may comprise a fuel injector instead of a spark plug and function using direct injection. An another alternative embodiment the engine 500 may be an HCCI compression ignition type engine and an homogeneous charge of well mixed fuel and air may be caused to auto ignite by movement of the first piston 505 towards the second piston 506 and/or movement of the second piston towards the first piston.

Figure 10:
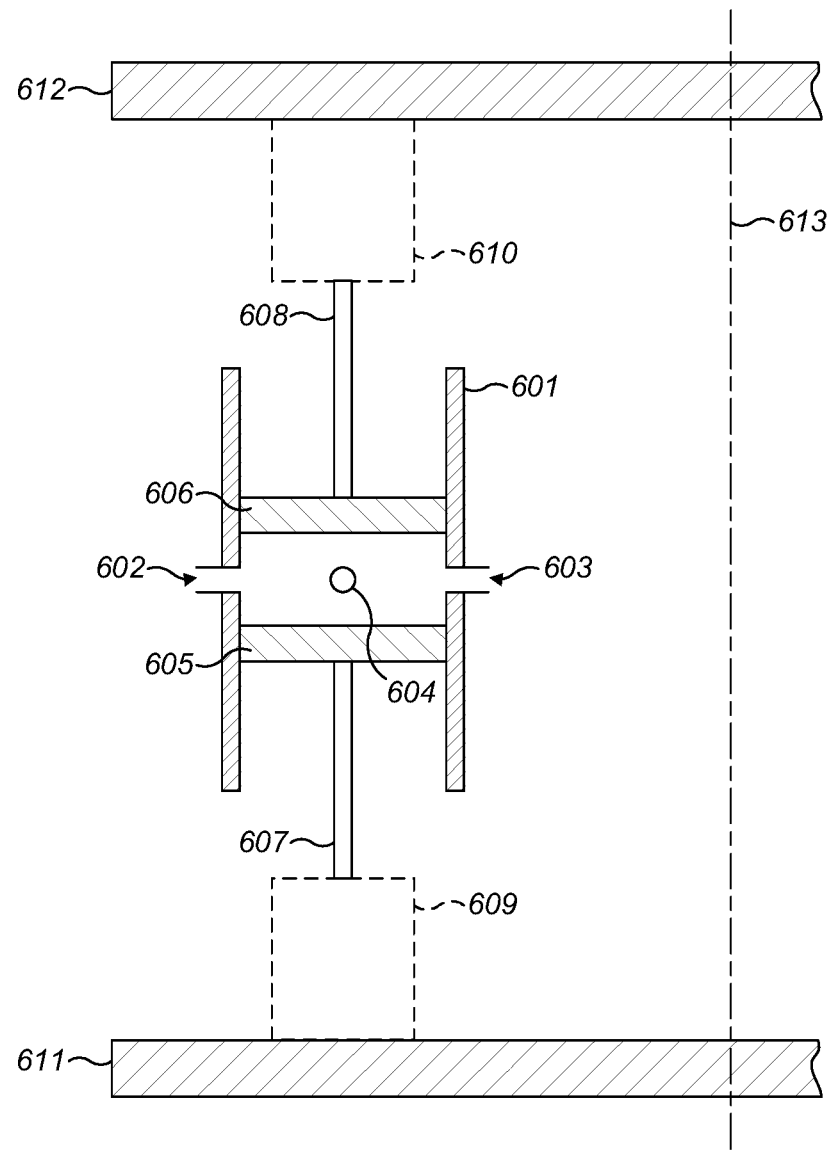
FIGS. 10 and 11a to 11e show an engine according to a third embodiment of the invention.

FIGS. 10 and to 11*a* to 11*e* show schematic views of an internal combustion engine 600 according to a third embodiment of the invention. The engine 600 comprises common cylinder 601 having an intake port 602 formed in its bore, an exhaust port 603 formed in its bore at a substantially similar location along a longitudinal axis of the common cylinder, and a spark plug 604 also provided at a substantially similar location along the longitudinal axis of the common cylinder. The engine 600 further comprises a first piston 605 moveable in reciprocating motion within the common cylinder and a second piston 606 also moveable in reciprocating motion within the common cylinder and opposing the first piston such that a combustion chamber is formed between the pistons. The first and second pistons 605, 606 are both connected via con rods 607, 608 to tracks 609, 610 provided on rotating disks 611, 612. The disks 611, 612 are rotationally fixed with respect to each other and rotate relative to the common cylinder 601 about a central axis of the engine 613. Rotation of the disks 611, 612 drives the pistons 605, 606 during some phases of the operating cycle the disks 611, 612 are driven by linear motion of the pistons in other phases, as will become apparent with reference to the following description of an operating cycle. The con rod and track arrangements of the first and second pistons are similar to those already described in relation to the main piston arrangement in the first embodiment of the invention and so are not shown or described in detail. The shapes of the tracks 609, 610 are, however, significantly different to the shape of the track 20 used for the main piston in the first embodiment due to the different piston displacement profiles required for each of the first and second pistons.

Figure 11A:
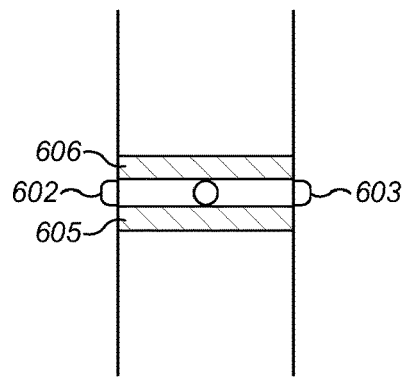
Figure 11B:
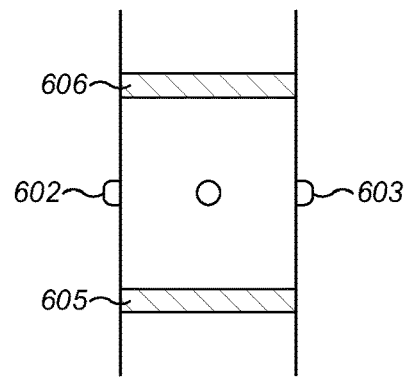
Figure 11C:
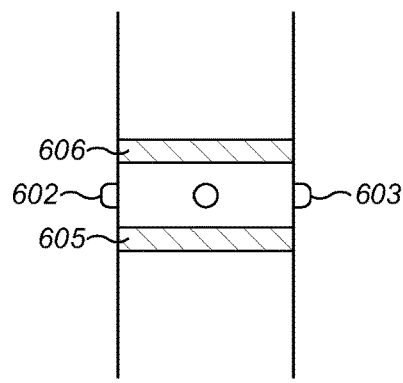
Figure 11D:
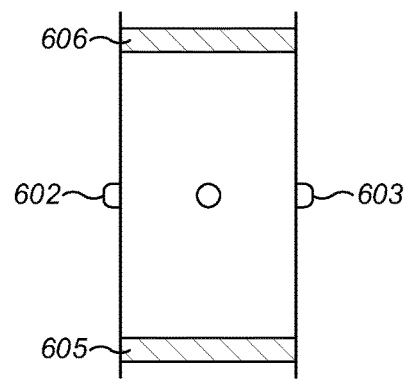
Figure 11E:
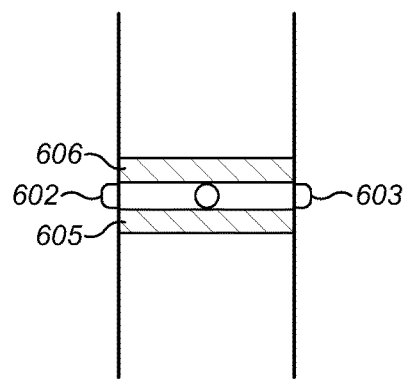

The engine 600 of the second embodiment functions according to the following operating cycle:

a) an intake phase in which the inlet valve 602 is open and the first piston 605 moves in a first direction away from the second piston 606 and the second piston 606 moves in a second direction away from the first piston 605 thereby drawing charge into the chamber formed between the first and second pistons (FIG. 11*a* to 11*b*);

b) a compression phase in which the first piston 605 moves in the second direction towards the second piston 606 and the second piston 606 moves in the first direction towards the first piston 605 thereby compressing the charge (FIG. 11*b* to 11*c*);

c) a power phase in which the first piston 605 moves in the first direction away from the second piston 606 and the second piston 606 moves in the second direction away from the first piston 605 thereby extracting work (FIG. 11*c* to 11*d*); and d) an exhaust phase in which the exhaust valve 603 is open and the first piston 605 moves in the second direction towards the second piston 606 and the second piston 606 moves in the first direction towards the first piston 605 thereby expelling the burnt charge from the chamber (FIG. 11*d* to 11*e*).

The BDC positions reached by the first and second pistons 605, 606 at the end of the intake phase (FIG. 11*b*) may be at the same or different locations to the BDC positions reached at the end of the power phase (FIG. 11*d*). The TDC positions reached by the first and second pistons 605, 606 at the end of the compression phase (FIG. 11*c*) may be at the same or different locations to the TDC positions reached at the end of the exhaust phase (FIG. 11*e*).

Combustion is initiated by the spark plug 604. In alternative embodiments the engine may be a compression ignition engine or an HCCI compression ignition engine. In this case ignition may be achieved by movement of the first piston 605 towards the second piston 606 and/or movement of the second piston towards the first piston.

In alternative embodiments the intake and exhaust ports may be replaced by a combined intake and exhaust port operated by a three-position valve as shown in FIGS. 6*a* to 6*c*. In alternative embodiments the common cylinder may be supplied with compressed intake air provided by a compression cylinder similar to that described above in reference to other embodiments. If a compression cylinder is included that the intake and compression phases may be eliminated and replaced by a single charging phase in which compressed charge in transferred from the compression cylinder into the common cylinder. The charging phase may be accompanied by a slight movement of the first and second pistons 605, 606 away from each other to assist with the transfer of compressed charge. The compressed change may then be ignited by the spark plug or alternatively by movement of the pistons towards each other to cause compression ignition or auto ignition in HCCI embodiments.

A steam phase may be included either during the power phase or in a separate steam power stroke after the exhaust phase.

Any of the above described engines may be modified to have a variable length con rod. The variable length con rod may be adjusted during operation of the engine to allow the piston displacement profile to be shifted towards or away from the cylinder head, for example to change the compression ratio.

Figure 12A:
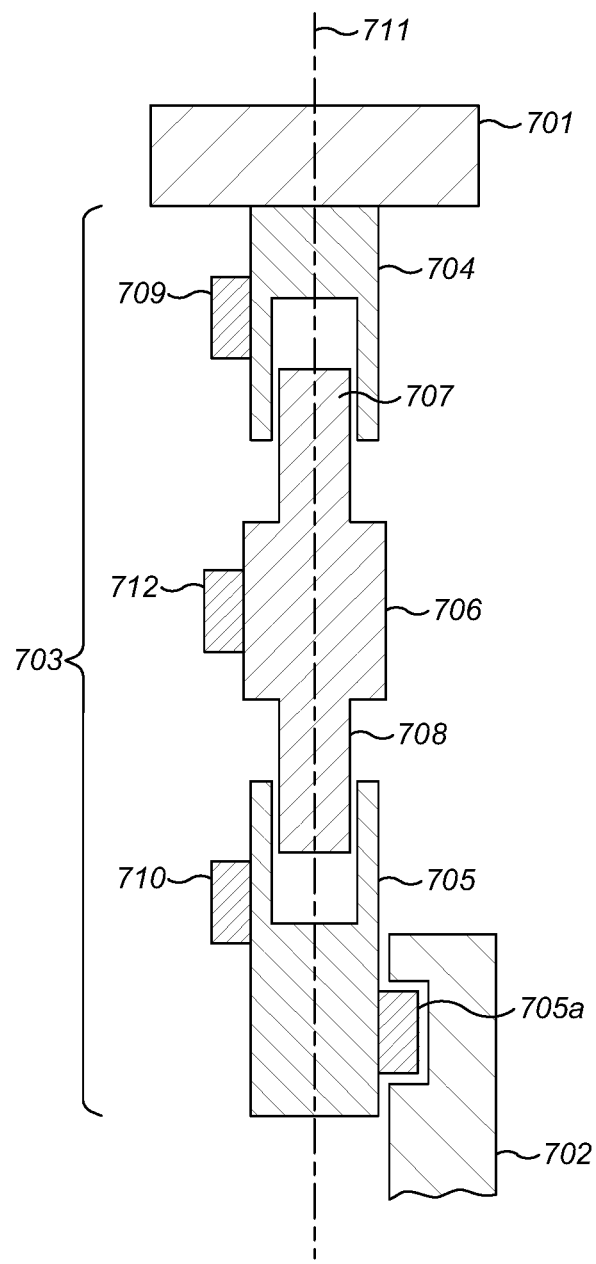
FIGS. 12a and 12b show variable length con rod arrangements.

FIG. 12*a* shows a first arrangement in which a piston head 701 is coupled to a track 702 by a variable length con rod 703. The variable length con rod 703 comprises a piston mounting section 704 coupled to the piston head, a track following section 705 coupled to the track via a follower 705*a*, and an intermediate section 706 having threaded connections 707 and 708 respectively with the piston mounting section and the track following section. The piston mounting section 704 and the track following section 705 each comprise protrusions 709 and 710 which are slidably received within position control grooves in the engine which prevent the piston mounting section and the track following section from rotating about the con rod axis 711. The intermediate section 706 has a protrusion 712 which is slidably received within a piston control groove provided in a rotatable body. The rotatable body may be rotated about the con rod axis 711, for example using an electric motor, thereby rotating the intermediate section. When the intermediate section is rotated in a first direction the threaded connections 707 and 708 move the piston mounting section 704 and the track following section 705 away from each other, thereby increasing the length of the con rod 703. When the intermediate section is rotated in a second direction opposite to the first direction the threaded connections 707 and 708 move the piston mounting section 704 and the track following section 705 towards each other, thereby decreasing the length of the con rod 703.

Figure 12B:
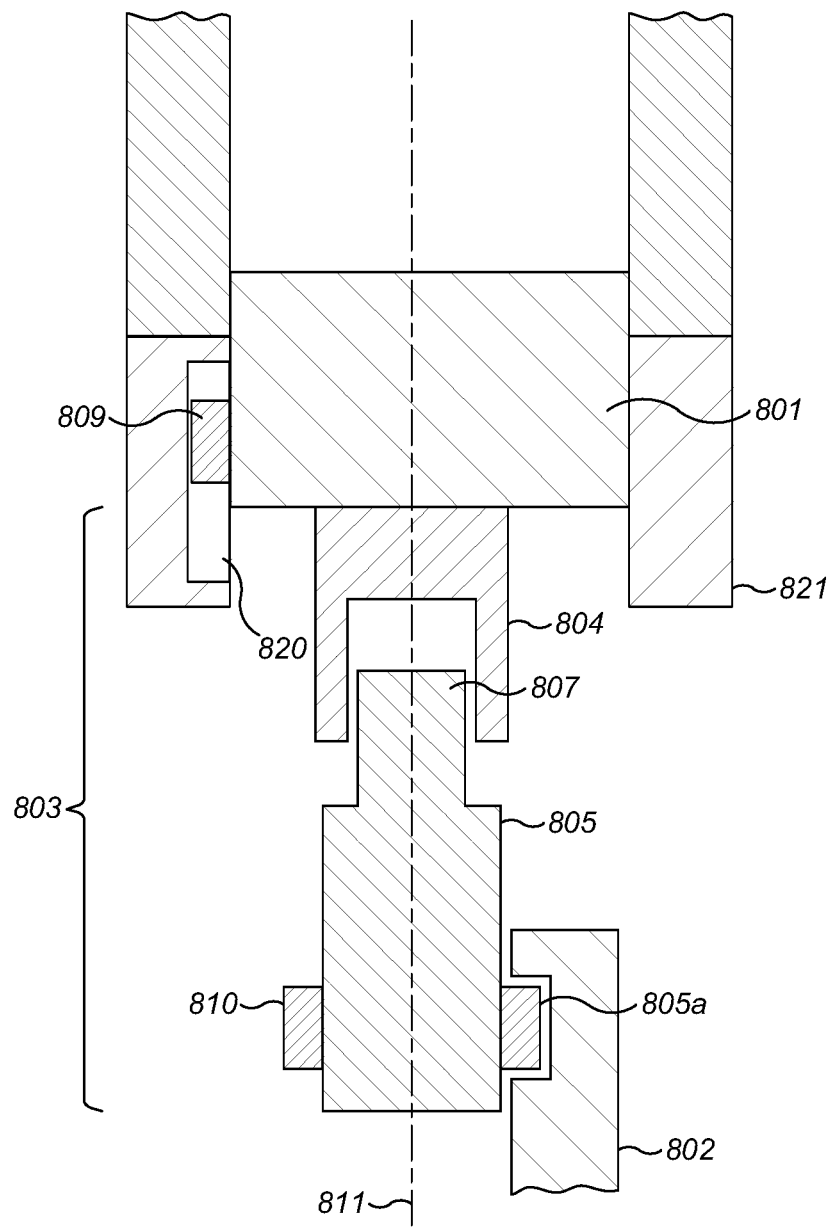

FIG. 12b shows a second arrangement in which a piston head 801 is coupled to a track 802 by a variable length con rod 803. The variable length con rod 803 comprises a piston mounting section 804 coupled to the piston head, and a track following section 805 coupled to the track via a follower 805a. The piston mounting section 804 has a threaded connection 807 with the track following section 805. The track following section 805 comprises a protrusion 810 which is slidably received within a position control groove in the engine which prevents the track following section from rotating about the con rod axis 811. The piston head has an extended skirt with a protrusion 809 which is slidably received within a piston control groove 820 provided in a rotatable body 821 mounted below the fixed bore of the cylinder. The rotatable body may be rotated about the con rod axis 811 to rotate the piston mounting section 804 relative to the track following section 805, thereby lengthening or shortening the con rod 803 as desired.

The present disclosure may include one or more of the following concepts:

A. A piston arrangement comprising a cylinder, a piston head movable along a piston axis within the cylinder, a con rod, and a track having a path; wherein the con rod has a first end which is coupled to the piston head and a second end which is coupled to the track; wherein the track is adapted to be moved relative to the cylinder and is shaped such that, as the track moves relative to the cylinder, the piston head moves in reciprocating motion along the piston axis in accordance with the path of the track; wherein the path of the track is shaped such that piston head displacement is non simple harmonic with respect to displacement of the track relative to the cylinder.

B. A piston arrangement in accordance with paragraph A, wherein the track has a path shape which is not sinusoidal.

C. A piston arrangement in accordance with any of the previous paragraphs, wherein the track has a first local minimum and a second local minimum different to the first local minimum such that as the piston head moves in reciprocating motion along the piston axis it passes through a first bottom dead centre position corresponding to the first local minimum of the track and subsequently passes through a second bottom dead centre position corresponding to the second local minimum of the track, wherein the piston is at a different displacement with respect to the cylinder when it is in the second bottom dead centre position to when it is in the first bottom dead centre position).

D. A piston arrangement in accordance with any of the previous paragraphs, wherein the track includes at least one portion of reduced gradient at a location between a local minimum of the track and an adjacent local maximum of the track such that as the piston head moves between a bottom dead centre position corresponding to the local minimum and a TDC position corresponding to the local maximum it experiences at least one period of reduced speed.

E. A piston arrangement in accordance with any of the previous paragraphs, wherein the track includes a prolonged portion of low gradient or zero gradient at or near a local maximum or local minimum of the track such that, as the piston head moves through a top dead centre position corresponding to the local maximum or through a bottom dead centre position corresponding to the local minimum, it experiences a substantial period of dwell time.

F. A piston arrangement in accordance with any of the previous paragraphs, wherein the track forms a closed loop and is provided on a rotating body.

G. A piston arrangement in accordance with any of the previous paragraphs, wherein the track is provided on a drum or disk which rotates relative to the cylinder.

H. A piston arrangement in accordance with paragraph G, wherein the track is provided on an inner or outer radial surface of a drum, or on an end surface of a drum, or on an outer radial surface of a disk or on an end surface of a disk.

I. A piston arrangement in accordance with paragraph H, wherein the track is recessed into and/or protrudes from a surface of the drum or disk.

J. A piston arrangement in accordance with any of the previous paragraphs, wherein the con rod has one or more followers which engage the track to control displacement of the con rod.

K. A piston arrangement in accordance with paragraph J, wherein the con rod has at least two followers which are spaced apart from each other in a direction parallel to the cylinder axis.

L. A piston arrangement in accordance with paragraphs J or K, wherein the con rod has at least two followers mounted to the con rod via a bogie which is pivotally mounted to the con rod.

M. A piston arrangement in accordance with paragraphs I, J or K, wherein the track includes a first surface which engages one or more of the followers to move the piston head in a first direction along the piston axis and a second surface opposing the first surface which engages one or more of the followers to move the piston head in a second direction opposite to the first direction along the cylinder axis).

N. A piston arrangement in accordance with any of the previous paragraphs, wherein the con rod is constrained to move substantially in the direction of the cylinder axis without rotating relative to the piston head.

O. A piston system including at least two piston arrangements in accordance with any of the previous paragraphs, wherein the respective con rods of the multiple piston arrangements are coupled to a common track.

P. A piston system including first and second piston arrangements in accordance with any of paragraphs A through N, wherein con rods of the first and second piston arrangements are respectively coupled to separate first and second tracks, wherein the first and second tracks are moveable with respect to each other to vary the relative timing of the respective piston heads of the first and second piston arrangements.

Q. An internal combustion engine comprising a piston arrangement in accordance with any of paragraphs A through N or a piston system in accordance with paragraphs O or P.

R. A piston arrangement comprising a cylinder, a piston head movable along a piston axis within the cylinder, a con rod, and a track; wherein the con rod has a first end which is coupled to the piston head and a second end which is coupled to the track; wherein the track is adapted to be moved relative to the cylinder and is shaped such that, as the track moves relative to the piston, the piston moves in reciprocating motion along the axis in accordance with the shape of the track; wherein the con rod has at least two followers which engage the track to control displacement of the con rod, the at least two followers being mounted to the con rod via a bogie which is pivotally mounted to the con rod.

S. An internal combustion engine comprising first and second piston arrangements in accordance with any of paragraphs A through N, wherein the first and second piston arrangements respectively comprise first and second piston heads movable within a common cylinder, wherein the first and second piston heads oppose each other such that a chamber is formed between the first and second piston heads.

T. An internal combustion engine in accordance with paragraph S, wherein the track is provided on a first rotating disk or drum, wherein the second track is provided on a second rotating disk or drum, and wherein the common cylinder is located between the first and second rotating disks or drums.

U. An internal combustion engine in accordance with paragraphs S or T, wherein the common cylinder comprises an intake port, an exhaust port and a spark plug or fuel injector.

V. An internal combustion engine in accordance with paragraph U, wherein the intake and exhaust ports are spaced apart from each other along a longitudinal axis of the common cylinder, and wherein the spark plug or fuel injector is located at an intermediate position between the intake port and the exhaust port.

W. An internal combustion engine in accordance with paragraph V which functions according to the following operating cycle: a) an intake phase in which the first and second piston heads are located on alternate sides of the intake port and the second piston head moves away from the firin st piston head in a first direction parallel to the common cylinder axis such that the volume of the chamber is increased and charge is drawn into the chamber; then b) a compression phase in which the first piston head moves in the first direction towards the second piston head such that the volume of the chamber is decreased and the charge is compressed; then c) a power phase in which the charge burns and the second piston head moves in the first direction away from the first head and extracts work; then d) an exhaust phase in which the first and second piston heads are located on alternate sides of the exhaust port and the first piston head moves in the first direction towards the second piston head such that the volume of the chamber is decreased and the burnt charge is expelled from the chamber via the exhaust port; then e) a recovery phase in which the first and second piston heads both move in a second direction parallel and opposite to the first direction back towards the intake port in preparation for the intake phase of the following cycle.

X. An internal combustion engine in accordance with paragraph W, wherein the operating cycle further includes a steam phase in which water and/or steam is injected into the chamber and work is extracted by the first and/or second piston.

Y. An internal combustion engine in accordance with paragraph X, wherein the steam phase occurs between the power phase and the exhaust phase and/or between the exhaust phase and the recovery phase.

Z. An internal combustion engine according in accordance with paragraphs S or T which functions according to the following operating cycle: a) an intake phase in which an inlet valve in the bore of the common cylinder is open and the first piston head moves in a first direction away from the second piston head and the second piston head moves in a second direction away from the first piston head thereby drawing charge into the chamber formed between the first and second pistons; b) a compression phase in which the first piston head moves in the second direction towards the second piston head and the second piston head moves in the first direction towards the first piston head thereby compressing the charge; c) a power phase in which the first piston head moves in the first direction away from the second piston head and the second piston head moves in the second direction away from the first piston head thereby extracting work; and d) an exhaust phase in which an exhaust valve in the bore of the common cylinder is open and the first piston head moves in the second direction towards the second piston head and the second piston head moves in the first direction towards the first piston head thereby expelling the burnt charge from the chamber.

AA. An internal combustion engine in accordance with paragraphs S or T further comprising a compression cylinder linked to the common cylinder by a transfer valve and adapted to compress a charge and supply the charge to the common cylinder.

BB. An internal combustion engine in accordance with paragraph AA, wherein the compression cylinder is operated by a piston arrangement in accordance with paragraphs A through M.

CC. An internal combustion engine in accordance with paragraphs AA and BB which functions according to the following operating cycle: a) a charging phase in which the transfer valve is open and the compression cylinder is operated to transfer pressurised charge into the chamber in the common cylinder formed between the first and second piston heads; b) a power phase in which the charge burns and the first piston head moves in a first direction away from the second piston head and extracts work and the second piston head moves in a second direction away from the first piston head and extracts work; and c) an exhaust phase in which the first piston head moves in the second direction towards the second piston head and the second piston head moves in the first direction towards the first piston head thereby expelling the burnt charge via an exhaust valve formed in a bore of the common cylinder.

DD. An internal combustion engine comprising a combustion cylinder operated by a first piston arrangement in accordance with paragraphs A through N, the engine further comprising a compression cylinder operated by a second piston arrangements according to any in accordance with paragraphs A through N, wherein the compression cylinder is adapted to receive a charge, compress the charge, and deliver the compressed charge to the combustion cylinder.

EE. An internal combustion engine in accordance with paragraph DD, wherein the compression cylinder is connected to the combustion cylinder by a transfer valve which may be selectively opened such that fluid flow from the compression cylinder into the combustion cylinder via the transfer valve is enabled and closed such that fluid flow through the transfer valve is not enabled.

FF. An internal combustion engine in accordance with paragraph EE which functions according to the following operating cycle: a) a charging phase in which the transfer valve is open and the compression cylinder is operated to transfer pressurised charge into the combustion cylinder while the piston head of the first piston arrangement is at or near a top dead centre position; b) a power phase in which the charge burns and the piston head of the first piston arrangement is moved towards a bottom dead centre position and extracts work; and c) an exhaust phase in which the piston head of the first piston arrangement moves towards a top dead centre position thereby expelling the burnt charge from the combustion cylinder via an exhaust valve.

GG. An internal combustion engine in accordance with paragraph FF, wherein the operating cycle further comprises a steam phase in which water and/or steam is injected into the chamber and work is extracted by the piston head of the first piston arrangement.

HH. An internal combustion engine in accordance with paragraph GG, wherein the steam phase occurs during the power phase and/or during an additional steam cycle phase between the exhaust phase and the following induction phase.

II. An internal combustion engine according to any of paragraphs DD to HH, wherein the combustion cylinder and compression cylinder are located between a hollow outer drum and an inner drum or shaft, wherein the outer drum and the inner drum or shaft are adapted to rotate relative to the combustion and compression cylinders, wherein the track of the first piston arrangement is provided on an inner surface of the outer drum.

JJ. An internal combustion engine according to any of paragraphs DD to II, wherein the compression cylinder is connected to the combustion cylinder by a transfer cylinder which is fluidically connected to the combustion cylinder, wherein a transfer piston is moveable in reciprocating motion within the bore of the transfer cylinder to open and close a transfer port connecting the compression piston to the transfer piston thereby controlling the flow of compressed charge into the combustion cylinder.

KK. An homogeneous charge compression ignition internal combustion engine comprising a combustion cylinder, a compression ignition cylinder which is fluidically connected to the combustion cylinder, and a compression ignition piston moveable in reciprocating motion within the compression ignition cylinder; wherein the compression ignition piston is adapted to be moved between a bottom dead centre position corresponding to a maximum volume of the compression ignition cylinder to a top dead centre position corresponding to a minimum volume of the compression ignition cylinder during operation of the engine to create a pressure spike within the combustion cylinder thereby causing auto ignition of a fuel/air mixture within the combustion cylinder.

LL. An internal combustion engine in accordance with paragraph KK, wherein the compression ignition piston is adapted to move from its bottom dead centre position to its top dead centre position and back to its bottom dead centre position at least once for every combustion cycle of the engine.

MM. An internal combustion engine in accordance with paragraph JJ, and either of paragraphs KK or LL, wherein a single piston and cylinder arrangement functions both as a transfer cylinder and a compression ignition cylinder.

NN. An internal combustion engine comprising a combustion chamber, and intake system, an exhaust system and a three-way valve fluidically connected to the combustion chamber via a port and further fluidically connected to the intake system and the exhaust system, wherein the three-way valve has a first position in which fluid is substantially prevented from flowing into or out of the combustion cylinder via the three-way valve, a second position in which the intake system is fluidically connected to the combustion chamber such that charge can be introduced to the combustion chamber through the port via the three-way valve, and a third position in which the intake exhaust system is fluidically connected to the combustion chamber such that burnt charge can be expelled from the combustion chamber to the exhaust system through the port via the three-way valve.

Although the invention has been described above with reference to one or more preferred embodiments, it will be appreciated that various changes or modifications may be made without departing from the scope of the invention as defined in the appended claims.

What is claimed is:

1. A homogeneous charge compression ignition internal combustion engine, comprising:
   a combustion cylinder;
   a combustion piston head movable along a piston axis within the combustion cylinder;
   an elongate connecting element; and
   a track having a path;
   wherein the elongate connecting element has a first end which is coupled to the combustion piston head and a second end which is coupled to the track;
   wherein the track is adapted to be moved relative to the combustion cylinder and is shaped such that, as the track moves relative to the combustion cylinder, the combustion piston head moves in reciprocating motion along the piston axis in accordance with the path of the track; and
   wherein the path of the track is shaped such that combustion piston head displacement is non simple harmonic with respect to displacement of the track relative to the combustion cylinder;
   a compression ignition cylinder fluidically connected to the combustion cylinder; and
   a compression ignition piston moveable in reciprocating motion within the compression ignition cylinder;
   wherein timing of the compression ignition piston is varied compared to the combustion piston head, such that ignition timing is variable according to operating conditions of the engine; and
   wherein the compression ignition piston is adapted to be moved between a bottom dead center (BDC) position corresponding to a maximum volume of the compression ignition cylinder and a top dead center (TDC) position corresponding to a minimum volume of the compression ignition cylinder during operation of the engine to create a pressure spike within the combustion cylinder, thereby causing auto ignition of a fuel/air mixture within the combustion cylinder.

2. The internal combustion engine according to claim 1, wherein the track has a path shape which is not sinusoidal.

3. A piston arrangement comprising:
   a cylinder;
   a piston head movable along a piston axis within the cylinder;
   an elongate connecting element; and
   a track having a path;
   wherein the elongate connecting element has a first end which is coupled to the piston head and a second end which is coupled to the track;
   wherein the track is adapted to be moved relative to the cylinder and is shaped such that, as the track moves relative to the cylinder, the piston head moves in reciprocating motion along the piston axis in accordance with the path of the track;
   wherein the path of the track is shaped such that piston head displacement is non simple harmonic with respect to displacement of the track relative to the cylinder;

wherein the track has a first local minimum and a second local minimum different to the first local minimum such that as the piston head moves in reciprocating motion along the piston axis it passes through a first bottom dead center position corresponding to the first local minimum of the track and subsequently passes through a second bottom dead center position corresponding to the second local minimum of the track; and wherein the piston head is at a different displacement with respect to the cylinder when it is in the second bottom dead center position to when it is in the first bottom dead center position.

4. The internal combustion engine according to claim 1, wherein the track includes at least one portion of reduced gradient at a location between a local minimum of the track and an adjacent local maximum of the track such that as the combustion piston head moves between a bottom dead center position corresponding to the local minimum and a top dead center position corresponding to the local maximum, the combustion piston head experiences at least one period of reduced speed.

5. The internal combustion engine according to claim 1, wherein the track includes a prolonged portion of low gradient or zero gradient at or near a local maximum or local minimum of the track such that, as the combustion piston head moves through a top dead center position corresponding to the local maximum or through a bottom dead center position corresponding to the local minimum, the combustion piston head experiences a substantial period of dwell time.

6. The internal combustion engine according to claim 1, wherein the track forms a closed loop and is provided on a rotating body.

7. A piston arrangement comprising:
a cylinder;
a piston head movable along a piston axis within the cylinder;
an elongate connecting element; and
a track having a path;
wherein the elongate connecting element has a first end which is coupled to the piston head and a second end which is coupled to the track;
wherein the track is adapted to be moved relative to the cylinder and is shaped such that, as the track moves relative to the cylinder, the piston head moves in reciprocating motion along the piston axis in accordance with the path of the track;
wherein the path of the track is shaped such that piston head displacement is non simple harmonic with respect to displacement of the track relative to the cylinder; and
wherein the track is provided on a drum or disk which rotates relative to the cylinder.

8. The piston arrangement according to claim 7, wherein the track is provided on an inner or outer radial surface of a drum, or on an end surface of a drum, or on an outer radial surface of a disk or on an end surface of a disk.

9. The piston arrangement according to claim 8, wherein the track is recessed into and/or protrudes from a surface of the drum or disk.

10. The internal combustion engine according to claim 1, wherein the elongate connecting element has one or more followers which engage the track to control displacement of the elongate connecting element.

11. The internal combustion engine according to claim 10, wherein the elongate connecting element has at least two followers which are spaced apart from each other in a direction parallel to the cylinder axis.

12. The internal combustion engine according to claim 10, wherein the elongate connecting element has at least two followers mounted to the elongate connecting element via a bogie which is pivotally mounted to the elongate connecting element.

13. The piston arrangement according to claim 10, wherein the track includes a first surface which engages one or more of the followers to move the piston head in a first direction along the piston axis and a second surface opposing the first surface which engages one or more of the followers to move the piston head in a second direction opposite to the first direction along the cylinder axis.

14. The internal combustion engine according to claim 1, wherein the elongate connecting element is constrained to move substantially in a direction along the cylinder axis without rotating relative to the combustion piston head.

15. A piston system comprising two or more piston arrangements, each of the piston arrangements including:
a cylinder;
a piston head movable along a piston axis within the cylinder;
an elongate connecting element; and
a track having a path;
wherein the elongate connecting element has a first end which is coupled to the piston head and a second end which is coupled to the track;
wherein the track is adapted to be moved relative to the cylinder and is shaped such that, as the track moves relative to the cylinder, the piston head moves in reciprocating motion along the piston axis in accordance with the path of the track;
wherein the path of the track is shaped such that piston head displacement is non simple harmonic with respect to displacement of the track relative to the cylinder; and
wherein the respective elongate connecting elements of the two or more piston arrangements are coupled to the same track.

16. A piston system including a first piston arrangement and a second piston arrangement;
the first piston arrangement comprising a first cylinder, a first piston head movable along a piston axis within the first cylinder, a first elongate connecting element, and a first track having a path; wherein the first elongate connecting element has a first end which is coupled to the first piston head and a second end which is coupled to the first track; wherein the first track is adapted to be moved relative to the first cylinder and is shaped such that, as the first track moves relative to the first cylinder, the first piston head moves in reciprocating motion along the piston axis in accordance with the path of the first track; wherein the path of the first track is shaped such that first piston head displacement is non simple harmonic with respect to displacement of the first track relative to the first cylinder;
the second piston arrangement comprising a second cylinder, a second piston head movable along a piston axis within the second cylinder, a second elongate connecting element, and a second track having a path; wherein the second elongate connecting element has a first end which is coupled to the second piston head and a second end which is coupled to the second track; wherein the second track is adapted to be moved relative to the second cylinder and is shaped such that, as the second track moves relative to the second cylinder, the second piston head moves in reciprocating motion along the piston axis in accordance with the path of the second track; wherein the path of the second track is shaped such that second piston head displacement is non simple harmonic with respect to displacement of the second track relative to the second cylinder;

wherein the first track and the second track are moveable with respect to each other to vary the relative timing of the first piston head and the second piston head.

17. A piston arrangement comprising a cylinder, a piston head movable along a piston axis within the cylinder, an elongate connecting element, and a track; wherein the elongate connecting element has a first end which is coupled to the piston head and a second end which is coupled to the track; wherein the track is adapted to be moved relative to the cylinder and is shaped such that, as the track moves relative to the cylinder, the piston moves in reciprocating motion along the axis in accordance with the shape of the track; wherein the elongate connecting element has at least two followers which engage the track to control displacement of the elongate connecting element, the at least two followers being mounted to the elongate connecting element via a bogie which is pivotally mounted to the elongate connecting element.

18. An internal combustion engine comprising:
a combustion cylinder operated by a first piston arrangement, and a compression cylinder operated by a second piston arrangement;
the first piston arrangement including a first cylinder, a first piston head movable along a piston axis within the first cylinder, a first elongate connecting element, and a first track having a path;
wherein the first elongate connecting element has a first end which is coupled to the first piston head and a second end which is coupled to the first track;
wherein the first track is adapted to be moved relative to the first cylinder and is shaped such that, as the first track moves relative to the first cylinder, the first piston head moves in reciprocating motion along the piston axis in accordance with the path of the first track;
wherein the path of the first track is shaped such that first piston head displacement is non simple harmonic with respect to displacement of the first track relative to the first cylinder;
the second piston arrangement comprising a second cylinder, a second piston head movable along a piston axis within the second cylinder, a second elongate connecting element, and a second track having a path;
wherein the second elongate connecting element has a first end which is coupled to the second piston head and a second end which is coupled to the second track;
wherein the second track is adapted to be moved relative to the second cylinder and is shaped such that, as the second track moves relative to the second cylinder, the second piston head moves in reciprocating motion along the piston axis in accordance with the path of the second track;
wherein the path of the second track is shaped such that second piston head displacement is non simple harmonic with respect to displacement of the second track relative to the second cylinder;
wherein the compression cylinder is adapted to receive a charge, compress the charge, and deliver the compressed charge to the combustion cylinder;
wherein the combustion cylinder and compression cylinder are located between a hollow outer drum and an inner drum or shaft;
wherein the outer drum and the inner drum or shaft are adapted to rotate relative to the combustion and compression cylinders; and
wherein the first track is provided on an inner surface of the outer drum.

19. The internal combustion engine according to claim 1, wherein the compression ignition piston is adapted to move from the BDC position to the TDC position and back to the BDC position at least once for every combustion cycle of the engine.

* * * * *